(12) United States Patent  
Yu et al.

(10) Patent No.: US 11,493,689 B2
(45) Date of Patent: Nov. 8, 2022

(54) PHOTONIC SEMICONDUCTOR DEVICE AND METHOD OF MANUFACTURE

(71) Applicant: Taiwan Semiconductor Manufacturing Co., Ltd., Hsinchu (TW)

(72) Inventors: Chen-Hua Yu, Hsinchu (TW); Hsing-Kuo Hsia, Jhubei (TW); Kuo-Chiang Ting, Hsinchu (TW); Sung-Hui Huang, Dongshan Township (TW); Shang-Yun Hou, Jubei (TW); Chi-Hsi Wu, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 16/930,558

(22) Filed: Jul. 16, 2020

(65) Prior Publication Data

US 2021/0088723 A1 Mar. 25, 2021

Related U.S. Application Data

(60) Provisional application No. 62/902,586, filed on Sep. 19, 2019.

(51) Int. Cl.
*G02B 6/122* (2006.01)
*G02B 6/12* (2006.01)

(52) U.S. Cl.
CPC ........ *G02B 6/1225* (2013.01); *G02B 6/12019* (2013.01); *G02B 2006/1213* (2013.01)

(58) Field of Classification Search
CPC ..... G02B 6/12; G02B 6/42; G02B 2006/1213
See application file for complete search history.

(56) References Cited

U.S. PATENT DOCUMENTS

2012/0207426 A1* 8/2012 Doany ................ G02B 6/426 385/14
2016/0216445 A1* 7/2016 Thacker ............... H01L 25/167
2019/0041594 A1* 2/2019 Li ........................ H01L 23/5385

* cited by examiner

*Primary Examiner* — Tina M Wong
(74) *Attorney, Agent, or Firm* — Slater Matsil, LLP

(57) ABSTRACT

A device includes a first package connected to an interconnect substrate, wherein the interconnect substrate includes conductive routing; and a second package connected to the interconnect substrate, wherein the second package includes a photonic layer on a substrate, the photonic layer including a silicon waveguide coupled to a grating coupler and to a photodetector; a via extending through the substrate; an interconnect structure over the photonic layer, wherein the interconnect structure is connected to the photodetector and to the via; and an electronic die bonded to the interconnect structure, wherein the electronic die is connected to the interconnect structure.

20 Claims, 20 Drawing Sheets

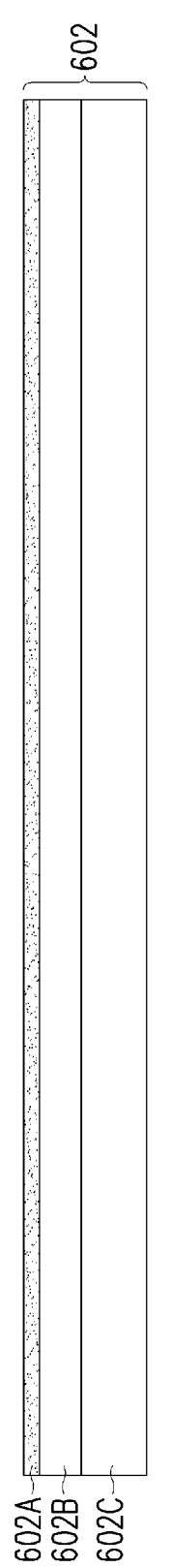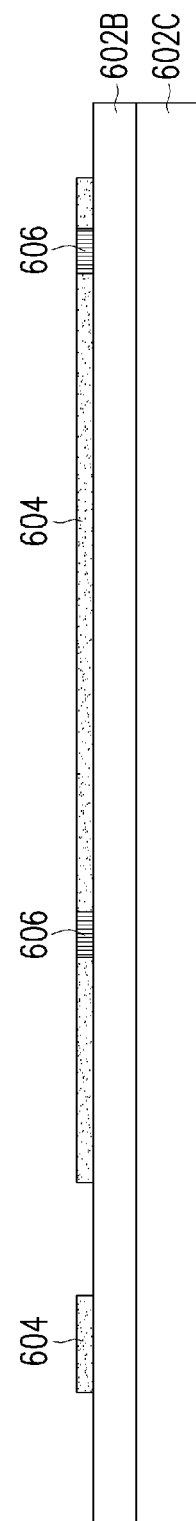
FIG. 20
FIG. 21

PHOTONIC SEMICONDUCTOR DEVICE AND METHOD OF MANUFACTURE

PRIORITY CLAIM AND CROSS-REFERENCE

This application claims the benefits of U.S. Provisional Application No. 62/902,586, filed on Sep. 19, 2019, which application is hereby incorporated herein by reference in its entirety.

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 20 through 22 illustrate cross-sectional views of intermediate steps of forming a photonic routing structure, in accordance with some embodiments.

DETAILED DESCRIPTION

Figure 1:
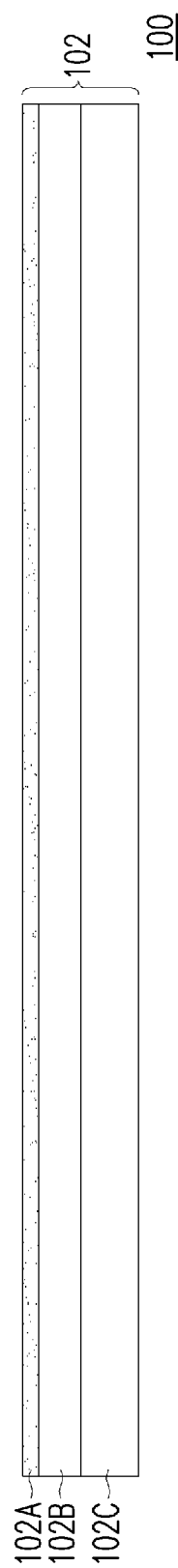
FIGS. 1 through 12 illustrate cross-sectional views of intermediate steps of forming a photonic package, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this disclosure, various aspects of a package and the formation thereof are described. Three-dimensional (3D) packages including both optical devices and electrical devices, and the method of forming the same are provided, in accordance with some embodiments. In particular, electronic dies are formed over a waveguide structure that provide an interface between electrical signals sent or received from a processing device and optical signals sent or received from an optical fiber or optical waveguide network. The intermediate stages of forming the packages are illustrated, in accordance with some embodiments. Some variations of some embodiments are discussed. Throughout the various views and illustrative embodiments, like reference numbers are used to designate like elements.

FIGS. 1 through 12 show cross-sectional views of intermediate steps of forming a photonic package 100 (see FIG. 11), in accordance with some embodiments. Turning first to FIG. 1, a buried oxide ("BOX") substrate 102 is provided, in accordance with some embodiments. The BOX substrate 102 includes an oxide layer 102B formed over a substrate 102C, and a silicon layer 102A formed over the oxide layer 102B. The substrate 102C may be, for example, a material such as a glass, ceramic, dielectric, a semiconductor, the like, or a combination thereof. In some embodiments, the substrate 102C may be a semiconductor substrate, such as a bulk semiconductor or the like, which may be doped (e.g., with a p-type or an n-type dopant) or undoped. The substrate 102C may be a wafer, such as a silicon wafer (e.g., a 12-inch silicon wafer). Other substrates, such as a multi-layered or gradient substrate may also be used. In some embodiments, the semiconductor material of the substrate 102C may include silicon; germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. The oxide layer 102B may be, for example, a silicon oxide or the like. In some embodiments, the oxide layer 102B may have a thickness between about 0.5 μm and about 4 μm, in some embodiments. The silicon layer 102A may have a thickness between about 0.1 μm and about 1.5 μm, in some embodiments. The BOX substrate 102 may be referred to as having a front side or front surface (e.g., the side facing upwards in FIG. 1), and a back side or back surface (e.g., the side facing downwards in FIG. 1).

Figure 2:
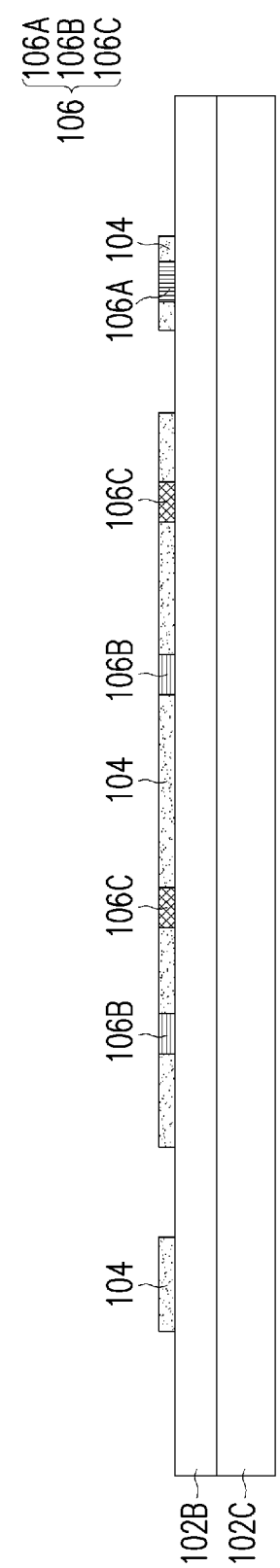

In FIG. 2, the silicon layer 102A is patterned to form silicon regions for waveguides 104 and photonic components 106, in accordance with some embodiments. The silicon layer 102A may be patterned using suitable photolithography and etching techniques. For example, a hardmask layer (e.g., a nitride layer or other dielectric material, not shown in FIG. 2) may be formed over the silicon layer 102A and patterned, in some embodiments. The pattern of the hardmask layer may then be transferred to the silicon layer 102A using one or more etching techniques, such as dry etching and/or wet etching techniques. For example, the silicon layer 102A may be etched to form recesses defining the waveguides 104, with the remaining unrecessed portions of the silicon layer 102A forming the waveguides 104, with sidewalls of the remaining unrecessed portions defining sidewalls of the waveguides 104. In some embodiments, more than one photolithography and etching sequence may be used in order to pattern the silicon layer 102A. One waveguide 104 or multiple waveguides 104 may be patterned from the silicon layer 102A. If multiple waveguides 104 are formed, the multiple waveguides 104 may be individual separate waveguides 104 or connected as a single continuous structure. In some embodiments, one or more of the waveguides 104 form a continuous loop. For example, in the cross-sectional view illustrated in FIG. 2, the portions of the waveguides 104 shown may be part of a continuous loop comprising a single waveguide 104. In some cases, the patterned silicon layer 102A may be referred to as a "photonic layer." Other configurations or arrangements of waveguides 104 or photonic components 106 are possible.

The photonic components 106 may be integrated with the waveguides 104, and may be formed with the silicon waveguides 104. The photonic components 106 may be optically coupled to the waveguides 104 to interact with optical signals within the waveguides 104. The photonic components 106 may include, for example, grating couplers 106A, photodetectors 106B, and/or modulators 106C. For example, a grating coupler 106A may be optically coupled to a waveguide 104 to externally transmit the optical signal within the waveguide 104 (e.g. to an optical fiber 150, see FIG. 11), a photodetector 106B may be optically coupled to a waveguide 104 to detect optical signals within the waveguide 104, and a modulator 106C may be optically coupled to a waveguide 104 to generate optical signals within the waveguide 104 by modulating optical power within the waveguide 104. In this manner, the photonic components 106 facilitate the input/output (I/O) of optical signals to and from the waveguides 104. In other embodiments, the photonic components 106 may include other active or passive components, such as laser diodes, waveguide edge couplers, optical signal splitters, or other types of photonic structures or devices. Optical power may be provided to the waveguides 104 by, for example, an optical fiber 150 (see FIG. 11) or generated by a photonic component 106 such as a laser diode.

The grating couplers 106A may be formed using acceptable photolithography and etching techniques. In an embodiment, the grating couplers 106A are formed after the waveguides 104 are defined. For example, a photoresist may be formed on the waveguides 104 and patterned. The photoresist may be patterned with openings corresponding to the grating couplers 106A. One or more etching processes may be performed using the patterned photoresist as an etching mask to form recesses in the waveguides 104 that define the grating couplers 106A. The etching processes may include one or more dry etching processes and/or wet etching processes.

In some embodiments, the photodetectors 106B may be formed by, for example, etching regions of the waveguides 104 and growing an epitaxial material on the remaining silicon of the etched regions. The waveguides 104 may be etched using acceptable photolithography and etching techniques. The epitaxial material may be, for example a semiconductor material such as germanium (Ge), which may be doped or un-doped. In some embodiments, an implantation process may be performed to introduce dopants within the silicon of the etched regions as part of the formation of the photodetector 106B. The silicon of the etched regions may be doped with p-type dopants, n-type dopants, or a combination.

In some embodiments, the modulators 106C may be formed by, for example, etching regions of the waveguides 104 and then implanting appropriate dopants within the remaining silicon of the etched regions. The waveguides 104 may be etched using acceptable photolithography and etching techniques. In some embodiments, the etched regions used for the photodetectors 106B and the etched regions used for the modulators 106C may be formed using one or more of the same photolithography or etching steps. The silicon of the etched regions may be doped with p-type dopants, n-type dopants, or a combination. In some embodiments, the etched regions used for the photodetectors 106B and the etched regions used for the modulators 106C may be implanted using one or more of the same implantation steps.

Figure 3:
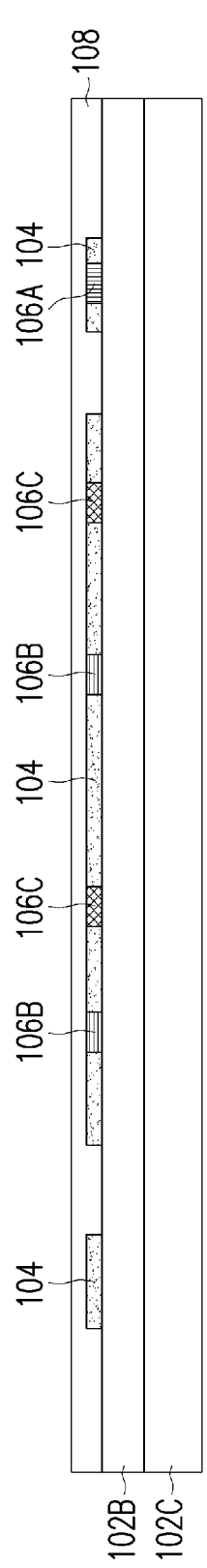

In FIG. 3, a dielectric layer 108 is formed on the front side of the substrate 102, in accordance with some embodiments. The dielectric layer 108 is formed over the waveguides 104, the photonic components 106, and the oxide layer 102B. The dielectric layer 108 may be formed of silicon oxide, silicon nitride, a combination thereof, or the like, and may be formed by CVD, PVD, atomic layer deposition (ALD), a spin-on-dielectric process, the like, or a combination thereof. In some embodiments, the dielectric layer 108 may be formed by a high density plasma chemical vapor deposition (HDP-CVD), a flowable CVD (FCVD) (e.g., a CVD-based material deposition in a remote plasma system and post curing to make it convert to another material, such as an oxide), the like, or a combination thereof. Other dielectric materials formed by any acceptable process may be used. In some embodiments, the dielectric layer 108 is then planarized using a planarization process such as a chemical-mechanical polishing (CMP) process, a grinding process, or the like. The dielectric layer 108 may be formed having a thickness over the oxide layer 102B between about 50 nm and about 500 nm, or a thickness over the waveguides 104 between about 10 nm and about 200 nm, in some embodiments. In some cases, a thinner dielectric layer 108 may allow for more efficient optical coupling between a grating coupler 106A and an overlying optical fiber 150 (see FIG. 11) or an overlying grating coupler 606 (see FIG. 24).

Due to the difference in refractive indices of the materials of the waveguides 104 and dielectric layer 108, the waveguides 104 have high internal reflections such that light is confined within the waveguides 104, depending on the wavelength of the light and the reflective indices of the respective materials. In an embodiment, the refractive index of the material of the waveguides 104 is higher than the refractive index of the material of the dielectric layer 108.

Figure 4:
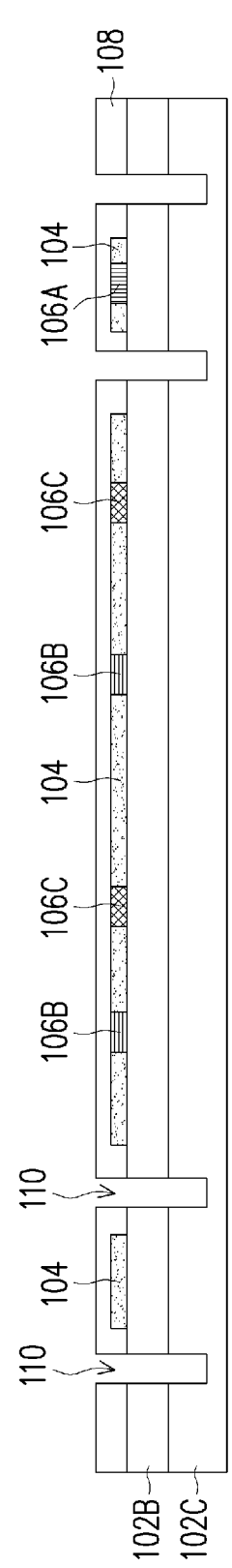

In FIG. 4, openings 110 are formed, in accordance with some embodiments. The openings 110 are formed extending through the dielectric layer 108 and the oxide layer 102B, and extend partially into the substrate 102C. The openings 110 may be formed by acceptable photolithography and etching techniques, such as by forming and patterning a photoresist and then performing an etching process using the patterned photoresist as an etching mask.

Figure 5:
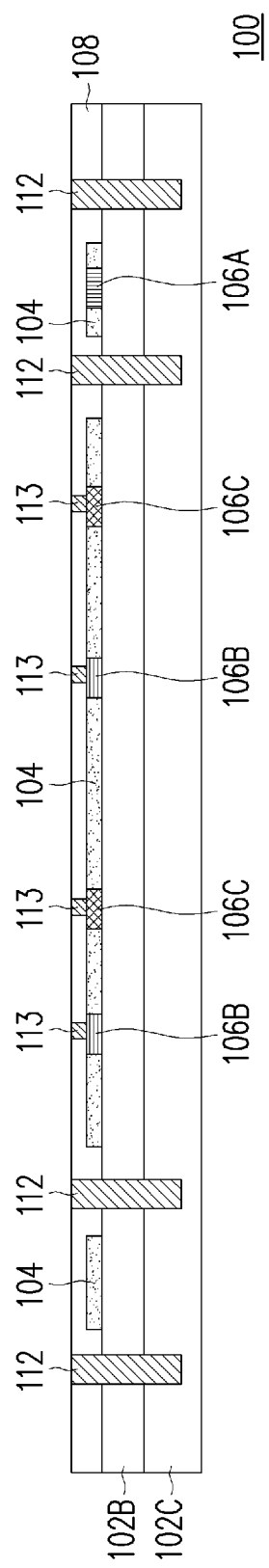

In FIG. 5, a conductive material is formed in the openings 110, thereby forming vias 112, in accordance with some embodiments. In some embodiments, a liner (not shown), such as a diffusion barrier layer, an adhesion layer, or the like, may be formed in the openings 110 from TaN, Ta, TiN, Ti, CoW, or the like, and may be formed using suitable a deposition process such as ALD or the like. In some embodiments, a seed layer (not shown), which may include copper or a copper alloy may then be deposited in the openings 110. The conductive material of the vias 112 is formed in the openings 110 using, for example, ECP or electro-less plating. The conductive material may include, for example, a metal or a metal alloy such as copper, silver, gold, tungsten, cobalt, aluminum, or alloys thereof. A planarization process, such as a CMP process or mechanical grinding may be performed to remove excess conductive material along the top surface of the dielectric layer 108, such that top surfaces of the vias 112 and the dielectric layer 108 are level.

FIG. 5 also shows the formation of contacts 113 that extend through the dielectric layer 108 to the photonic components 106. For example, the contacts 113 may make electrical connection to photonic components 106 such as photodetectors 106B and/or modulators 106C. The contacts 113 allow electrical power or electrical signals to be transmitted to the photonic components 106 and electrical signals to be transmitted from the photonic components 106. In this manner, the photonic components 106 may convert electrical signals (e.g., from an electronic die 122, see FIG. 7) into optical signals transmitted by the waveguides 104, and/or convert optical signals from the waveguides 104 into electrical signals (e.g., that may be received by an electronic die 122). The contacts 113 may be formed before or after formation of the vias 112, and the formation of the contacts 113 and the formation of the vias 112 may share some steps such as deposition of the conductive material or planarization. In some embodiments, the contact may be formed by a damascene process, e.g., dual damascene, single damascene, or the like. For example, in some embodiments, openings (not shown) for the contacts 113 are first formed in the oxide layer 108 using acceptable photolithography and etching techniques. A conductive material may then be formed in the openings, forming the contacts 113. The conductive material of the contacts 113 may be formed of a metal or a metal alloy including aluminum, copper, tungsten, or the like, which may be the same as that of the vias 112. The contacts 113 may be formed using other techniques or materials in other embodiments.

Figure 6:
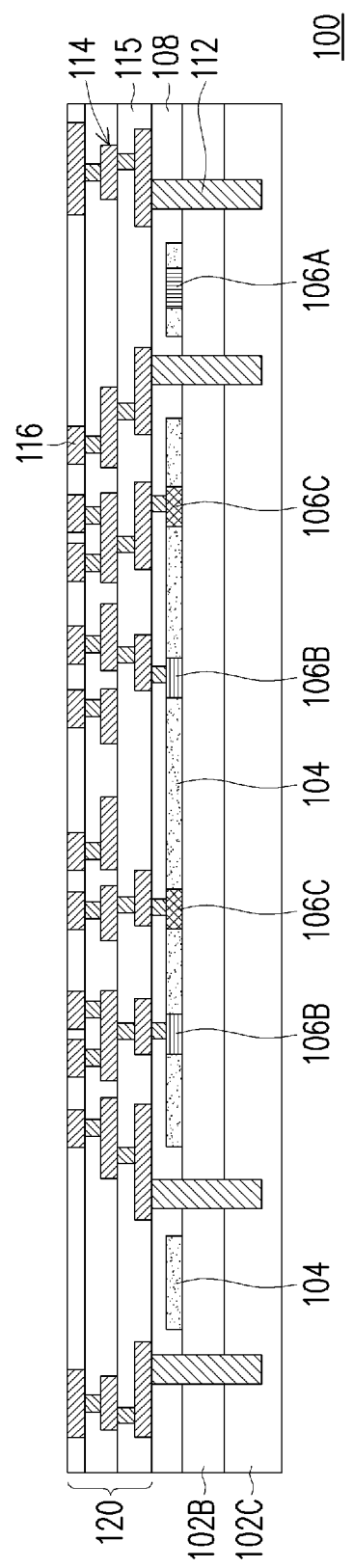

In FIG. 6, an interconnect structure 120 is formed over the dielectric layer 108, in accordance with some embodiments. The interconnect structure 120 includes dielectric layers 115 and conductive features 114 formed in the dielectric layers 115 that provide interconnections and electrical routing. For example, the interconnect structure 120 may connect the vias 112, the contacts 113 of the photonic components 106, and overlying devices such as electronic dies 122 (see FIG. 7). The dielectric layers 115 may be, for example, insulating or passivating layers, and may include a material similar to those described above for the dielectric layer 108, such as a silicon oxide, or may include a different material. The dielectric layers 115 may be formed using a technique similar to those described above for the dielectric layer 108 or using a different technique. The conductive features 114 may include conductive lines and vias, and may be formed by a damascene process, e.g., dual damascene, single damascene, or the like. As shown in FIG. 6, conductive pads 116 are formed in the topmost layer of the dielectric layers 115. A planarization process (e.g., a CMP process or the like) may be performed after forming the conductive pads 116 such that surfaces of the conductive pads 116 and the topmost dielectric layer 115 are substantially coplanar. The interconnect structure 120 may include more or fewer dielectric layers 115, conductive features 114, or conductive pads 116 than shown in FIG. 6. The interconnect structure 120 may be formed having a thickness between about 4 μm and about 7 μm, in some embodiments.

In some embodiments, some regions of the interconnect structure 120 are substantially free of the conductive features 114 or conductive pads 116 in order to allow transmission of optical power or optical signals through the dielectric layers 115. For example, these regions may extend between the grating couplers 106A and an overlying optical fiber 150 (see FIG. 11) to allow optical power or optical signals to be coupled from the waveguides 104 into the optical fiber 150 and/or to be coupled from the optical fiber 150 into the waveguides 104. In some cases, a thinner interconnect structure 120 may allow for more efficient optical coupling between a grating coupler 106A and an overlying optical fiber 150 or an overlying grating coupler 606 (see FIG. 24).

Figure 7:
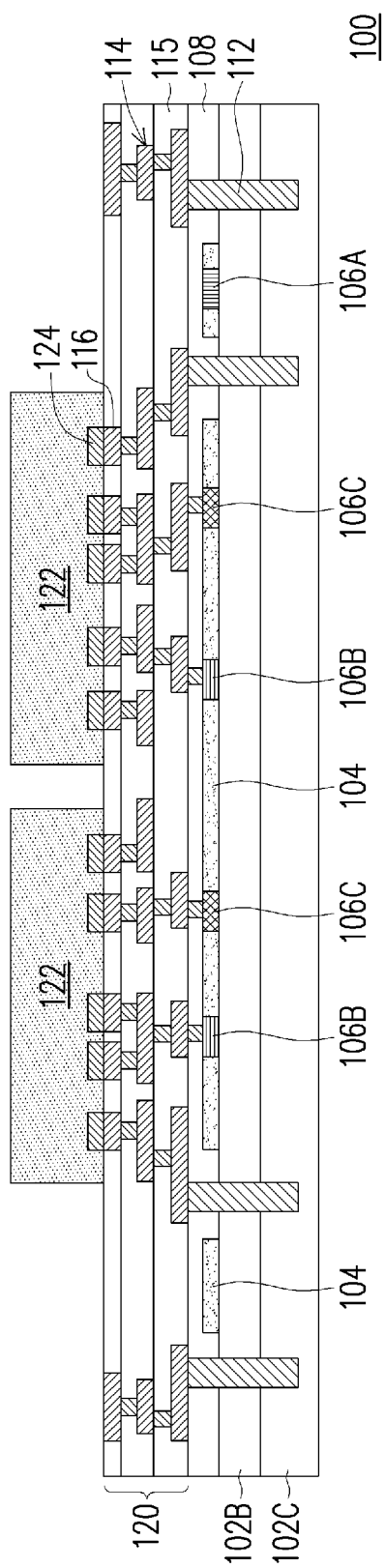

In FIG. 7, electronic dies 122 are bonded to the interconnect structure 120, in accordance with some embodiments. The electronic dies 122 may be, for example, semiconductor devices, dies, or chips that communicate with the photonic components 106 using electrical signals. Two electronic dies 122 are shown in FIG. 7, but a photonic package 100 may include one electronic die 122 or more than two electronic dies 122. In some cases, multiple electronic dies 122 may be incorporated into a single photonic package 100 in order to reduce processing cost. The electronic dies 122 each include die connectors 124, which may be, for example, conductive pads, conductive pillars, or the like. In some embodiments, the electronic dies 122 may have a thickness between about 10 μm and about 35 μm.

The electronic dies 122 may include integrated circuits for interfacing with the photonic components 106, such as circuits for controlling the operation of the photonic components 106. An electronic die 122 may also include a CPU, in some embodiments. In some embodiments, the electronic dies 122 include circuits for processing electrical signals received from photonic components 106, such as electrical signals received from a photodetector 106B. The electronic dies 122 may include controllers, drivers, transimpedance amplifiers, the like, or combinations thereof. The electronic dies 122 may control high-frequency signaling of the photonic components 106 according to electrical signals (digital or analog) received from another device, such as from a computing package 200 (see FIG. 13), in some embodiments. In some embodiments, the electronic dies 122 may be electronic integrated circuits (EICs) or the like that provide Serializer/Deserializer (SerDes) functionality.

In some embodiments, the electronic dies 122 are bonded to the interconnect structure 120 by hybrid bonding. In such embodiments, covalent bonds are formed between oxide layers, such as the topmost dielectric layers 115 and surface dielectric layers (not shown) of the electronic dies 122. During the hybrid bonding, metal bonding also occurs between the die connectors 124 of the electronic dies 122 and the conductive pads 116 of the interconnect structure 120. By bonding the electronic dies 122 to the interconnect structure using hybrid bonding, the thickness of the resulting photonic package 100 may be reduced, which may allow for improved optical coupling between grating couplers 106A and optical fibers 150 (see FIG. 11). Additionally, the use of hybrid bonding may allow for materials transparent to the relevant wavelengths of light (e.g., silicon oxide) to be used instead of opaque materials such as an encapsulant or a molding compound. This allows the interconnect structure 120 and electronic dies 122 to be located above the grating couplers 106A and other photonic components to be formed as described here. In this manner, the size or processing costs of a photonic structure may be reduced, and the optical coupling to external components may be improved.

In some embodiments, before performing the hybrid bonding process, a surface treatment is performed on the electronic dies 122. In some embodiments, the top surfaces of the interconnect structure 120 and/or the electronic dies 122 may first be activated utilizing, for example, a dry treatment, a wet treatment, a plasma treatment, exposure to an inert gas, exposure to $H_2$, exposure to $N_2$, exposure to $O_2$, the like, or combinations thereof. However, any suitable activation process may be utilized. After the activation process, the interconnect structure 120 and/or the electronic dies 122 may be cleaned using, e.g., a chemical rinse. The electronic dies 122 are then aligned with the interconnect structure 120 and placed into physical contact with the interconnect structure 120. The electronic dies 122 may be placed on the interconnect structure 120 using a pick-and-place process, for example. The interconnect structure 120 and the electronic dies 122 may then subjected to a thermal treatment and/or pressed against each other (e.g., applying contact pressure) to hybrid bond the interconnect structure 120 and the electronic dies 122. For example, interconnect structure 120 and the electronic dies 122 may be subjected to a pressure of about 200 kPa or less, and a temperature between about 200° C. and about 400° C. The interconnect structure 120 and the electronic dies 122 may then be subjected to a temperature at or above the eutectic point of the material of the conductive pads 116 and the die connectors 124, e.g., between about 150° C. and about 650° C. to fuse the conductive pads 116 and the die connectors 124. In this manner, bonding of interconnect structure 120 and the electronic dies 122 forms a hybrid bonded structure. In some embodiments, the hybrid bonded structure is baked, annealed, pressed, or otherwise treated to strengthen or finalize the bond.

In other embodiments, the electronic dies 122 may be bonded to the interconnect structure 120 by direct surface bonding, metal-to-metal bonding, or another bonding process. A direct surface bonding process creates an oxide-to-oxide bond or substrate-to-substrate bond through a cleaning and/or surface activation process followed by applying pressure, heat and/or other bonding process steps to the joined surfaces. In some embodiments, the electronic dies 122 and the interconnect structure 120 are bonded by metal-to-metal bonding that is achieved by fusing conductive elements. Any suitable bonding process may be utilized.

Figure 8:
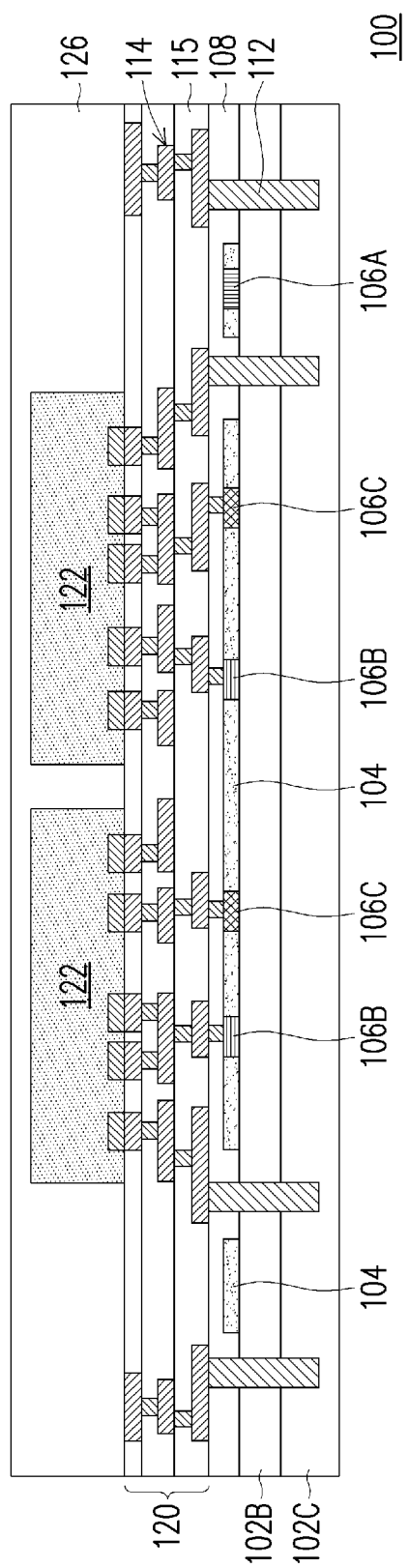

Turning to FIG. 8, a dielectric material 126 is formed over the electronic dies 122 and the interconnect structure 120, in accordance with some embodiments. The dielectric material 126 may be formed of silicon oxide, silicon nitride, a polymer, the like, or a combination thereof. The dielectric material 126 may be formed by CVD, PVD, ALD, a spin-on-dielectric process, the like, or a combination thereof. In some embodiments, the dielectric material 126 may be formed by HDP-CVD, FCVD, the like, or a combination thereof. The dielectric material 126 may be a gap-fill material in some embodiments, which may include one or more of the example materials above. Other dielectric materials formed by any acceptable process may be used.

Figure 9:
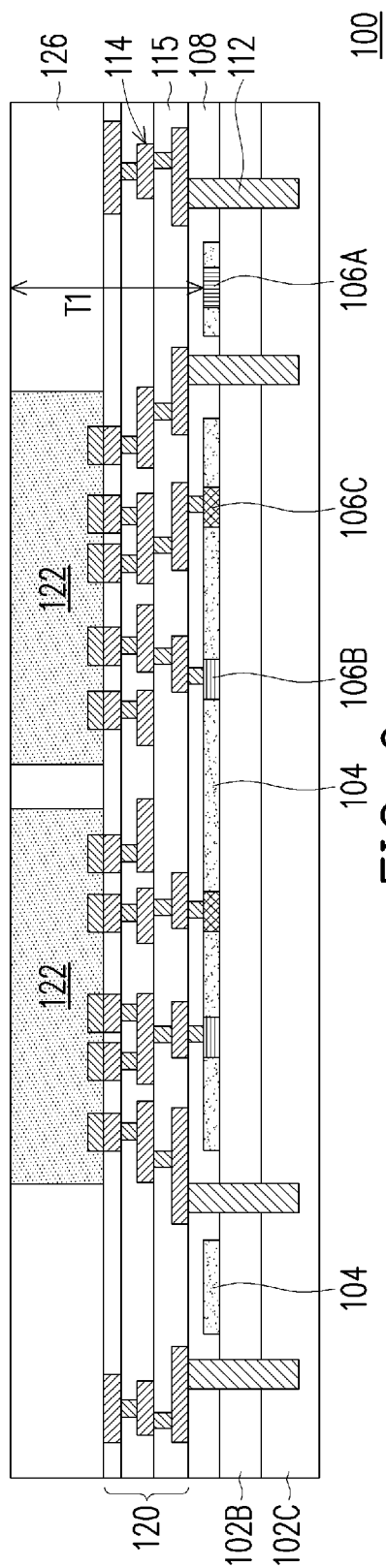

Turning to FIG. 9, the dielectric material 126 may be planarized, in accordance with some embodiments. The dielectric material 126 may be planarized using a planarization process such as a CMP process, a grinding process, or the like. The planarization process may expose the electronic dies 122 such that surfaces of the electronic dies 122 and surfaces of the dielectric material 126 are coplanar. After planarization, the dielectric material 126 may have a thickness over the interconnect structure 120 that is between about 10 µm and about 40 µm. In some embodiments, the combined thickness T1 of the dielectric layer 108, the dielectric layers 115, and the dielectric material 126 over the grating couplers 106A may be between about 14 µm and about 50 µm. In some cases, a smaller thickness T1 may allow for more efficient optical coupling between a grating coupler 106A and an overlying optical fiber 150 (see FIG. 11) or grating coupler 606 (see FIG. 24). For example, in some embodiments, the thickness T1 may be less than about 30 µm.

Figure 10:
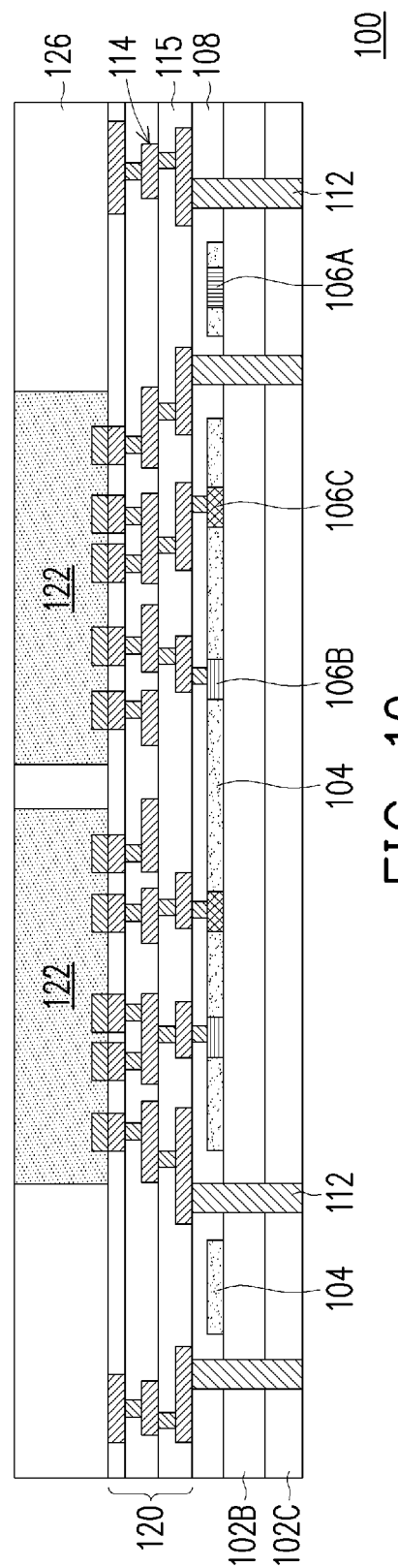
Figure 11:
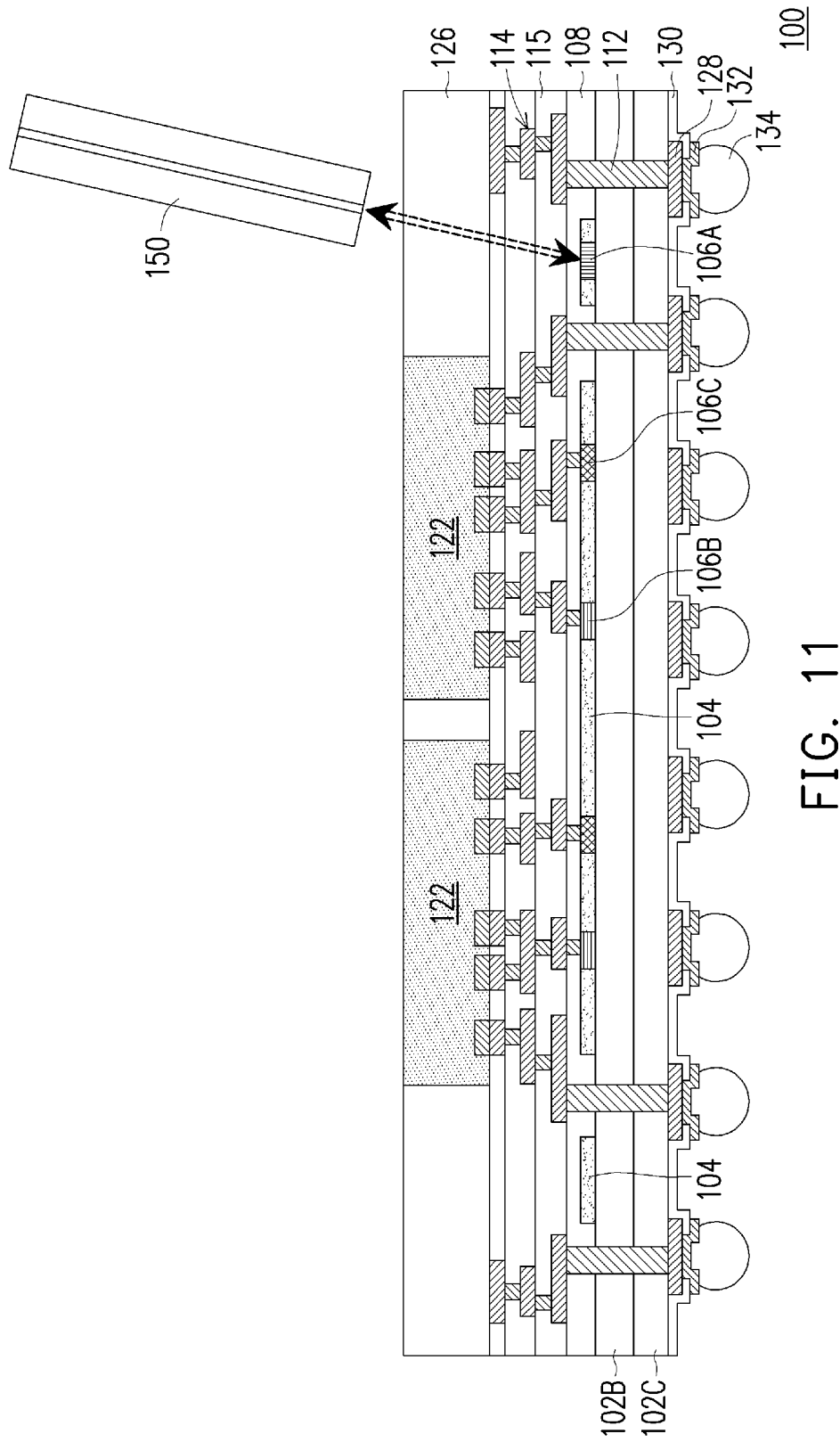

In FIG. 10, the back side of the substrate 102C is thinned to expose the vias 112. The substrate 102C may be thinned by a CMP process, a mechanical grinding, or the like. In FIG. 11, conductive pads 128 are formed on the exposed vias 112 and the substrate 102C, in accordance with some embodiments. The conductive pads 128 are electrically connected to the interconnect structure 120. The conductive pads 128 may be, for example, aluminum pads or aluminum-copper pads, although other metallic pads may be used. In some embodiments, a passivation film 130 may be formed on the substrate 102C, covering the conductive pads 128. The passivation film 130 may be formed from a dielectric material, such as silicon oxide, silicon nitride, the like, or combinations thereof. Openings may be formed through the passivation film 130 to expose central portions of the conductive pads 128. Underbump metallizations (UBMs) 132 may be formed on the conductive pads 128 and passivation film 130, in some embodiments. The UBMs 132 may be formed by, for example, forming a blanket conductive layer on the passivation film 130 and in the openings, such as by electroplating. The conductive layer may be formed from copper, a copper alloy, silver, gold, aluminum, nickel, the like, or combinations thereof. The conductive layer may be patterned to form the UBMs 132.

Still referring to FIG. 11, conductive connectors 134 are formed on the UBMs 132 to form a photonic package 100, in accordance with some embodiments. conductive connectors 134 may be ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 134 may include a conductive material such as solder, copper, aluminum, gold, nickel, silver, palladium, tin, the like, or a combination thereof. In some embodiments, the conductive connectors 134 are formed by initially forming a layer of solder through such commonly used methods such as evaporation, electroplating, printing, solder transfer, ball placement, or the like. Once a layer of solder has been formed on the structure, a reflow may be performed in order to shape the material into the desired bump shapes. In another embodiment, the conductive connectors 134 are metal pillars (such as a copper pillar) formed by a sputtering, printing, electro plating, electroless plating, CVD, or the like. The metal pillars may be solder free and have substantially vertical sidewalls. In some embodiments, a metal cap layer (not shown) is formed on the top of the conductive connectors 134. The metal cap layer may include nickel, tin, tin-lead, gold, silver, palladium, indium, nickel-palladium-gold, nickel-gold, the like, or a combination thereof and may be formed by a plating process.

In some embodiments, multiple photonic packages 100 may be formed on a single BOX substrate 102 and then singulated to form individual photonic packages 100 such as the photonic package 100 shown in FIG. 11. In some embodiments, a photonic package 100 may have a thickness between about between about 50 µm and about 150 µm. The photonic package 100 described herein allows for optical communication with an optical fiber 150. In particular, the photonic package 100 described herein allows for optical communication with an optical fiber 150 mounted above the photonic package 100 (e.g., in a "vertical" orientation as shown in FIG. 11). The optical fiber 150 may be mounted using an optical glue or the like. The optical signals are transmitted through the dielectric layer 108, the dielectric layers 115, and the dielectric material 126 formed over the grating couplers 106A. For example, optical signals may be transmitted from the optical fiber 150 to the grating coupler 106A and into the waveguides 104, wherein the optical signals may be detected by a photodetector 106B and transmitted as electrical signals into an electronic die 122. Mounting the optical fiber 150 in a "vertical" orientation may allow for improved optical coupling, reduced processing cost, or greater design flexibility. In some embodiments, the photonic packages 100 described herein could be considered system-on-chip (SoC) or system-on-integrated-circuit (SoIC) devices.

Figure 12:
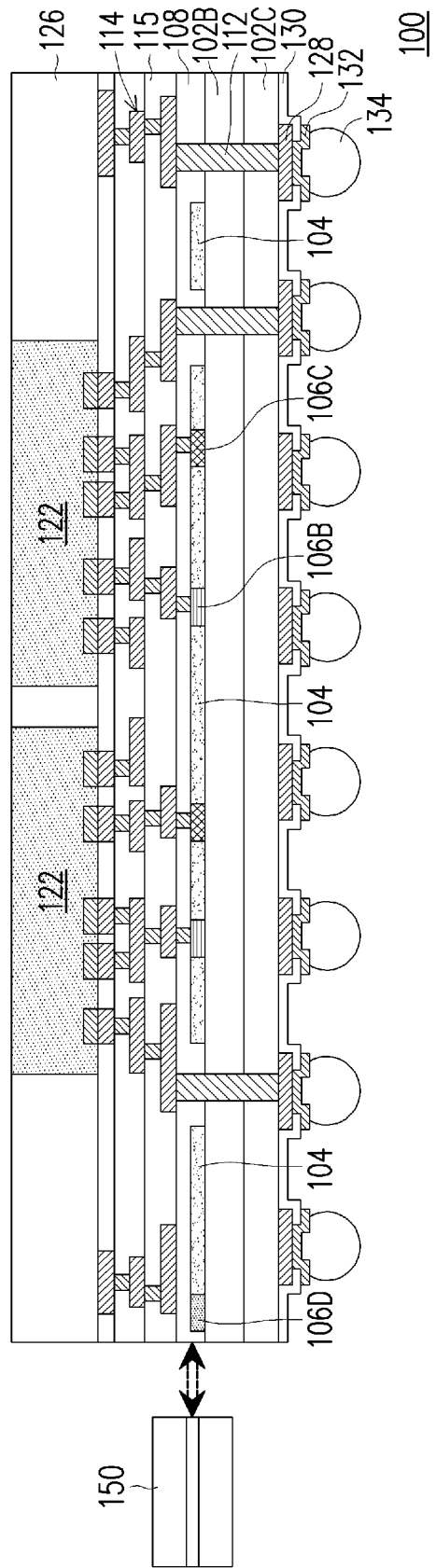

FIG. 12 illustrates a photonic package 100 that is optically coupled to an optical fiber 150 using an edge coupler 106D, in accordance with some embodiments. The edge coupler 106D is a photonic component 106 that allows for optical signals to be coupled between the waveguides 104 and an optical fiber 150 mounted at the edge of the photonic package 100. The edge coupler 106D may be continuous with the waveguides 104 and may be formed in the same processing steps as the waveguides 104 or other photonic components 106. In some embodiments, a photonic package 100 may include both a vertically mounted optical fiber 150 and an edge mounted optical fiber. In this manner, photonic structures 100 as described herein may be used in a variety of configurations with optical fibers 150.

Figure 13:
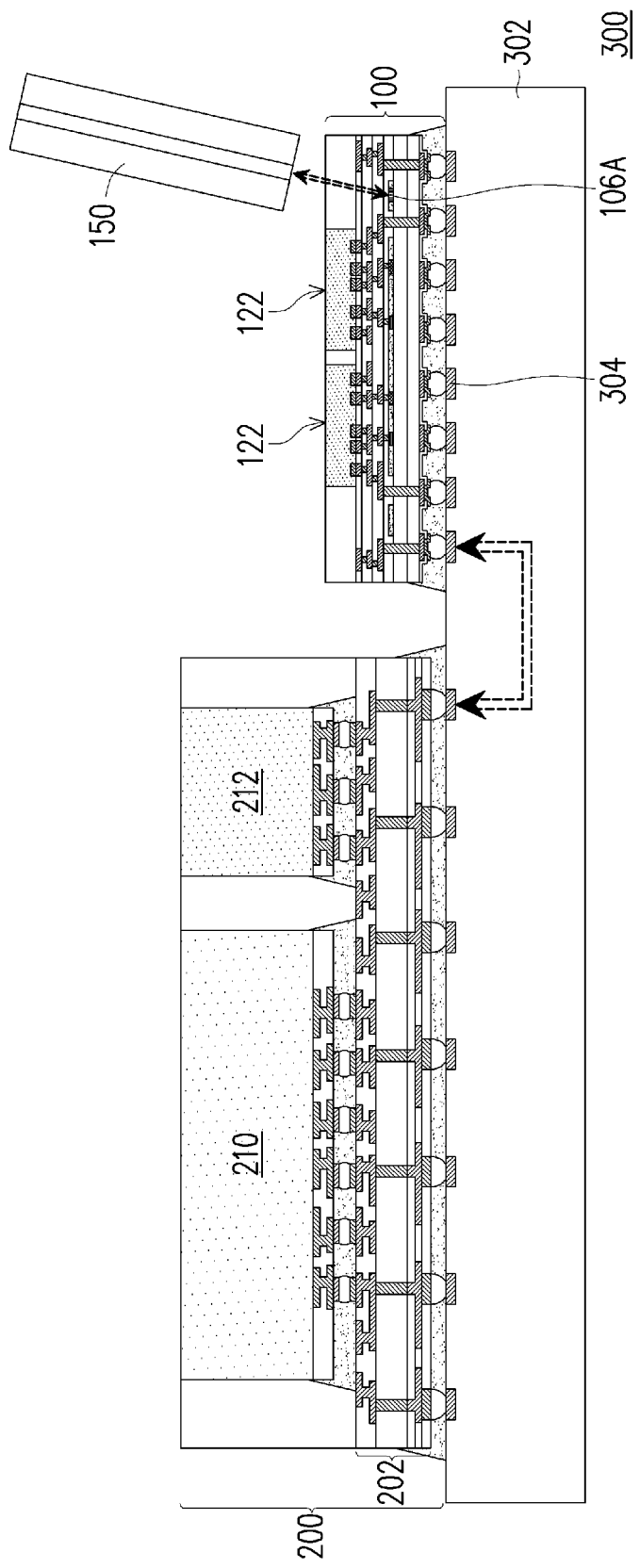
FIGS. 13 through 15 illustrate cross-sectional views and plan views of a photonic system, in accordance with some embodiments.

FIG. 13 illustrates a photonic system 300, in accordance with some embodiments. The photonic system 300 includes one or more photonic packages 100 and one or more computing packages 200 that are attached to an interconnect substrate 302. The photonic packages 100 may be similar to those described in FIGS. 11-12. The photonic package 100 facilitates optical communication between the computing package 200 and external devices, optical networks, or the like. In this manner, a photonic system 300 may combine computing packages 200 and photonic packages 300 on a single interconnect substrate 302 that allows for interfacing with one or more optical fibers 150. The optical fibers 150 may be vertically mounted as shown in the photonic package 100 of FIG. 11 or edge mounted as shown in the photonic package 100 of FIG. 12. In some embodiments, a photonic system 300 may include a combination of multiple photonic packages 100 that are coupled to vertically mounted and/or edge mounted optical fibers 150.

In some embodiments, a computing package 200 may include one or more semiconductor devices, chips, dies, system-on-chip (SoC) devices, system-on-integrated-circuit (SoIC) devices, the like, or a combination thereof. For example, the computing package 200 includes a processing die 210 and a memory die 212, though in other embodiments a computing package 200 may include more or fewer devices and/or devices of different types than these. The processing die 210 may include, for example, a central processing unit (CPU), a graphics processing unit (GPU), an application-specific integrated circuit (ASIC), a high performance computing (HPC) die, the like, or a combination thereof. The memory die 212 may include, for example, a volatile memory such as dynamic random-access memory (DRAM), static random-access memory (SRAM), another type of memory, or the like. In some embodiments, the processing die 210 and the memory die 212 may be attached to an interconnect structure 202, though in other embodiments an interconnect structure 202 may not be present. The interconnect structure 202 may include conductive routing (e.g., conductive lines, vias, through vias, or the like) that electrically connects the processing die 210 and the memory die 212. In such embodiments, processing and memory functionality may be integrated within the same device of the computing package 200. These and other configurations of a computing package 200 are considered within the scope of the present disclosure.

The photonic package 100 and/or the computing package 200 may be electrically connected to the interconnect substrate 302 by conductive connectors such as solder bumps or the like. In some embodiments, an underfill may be formed between the photonic package 100 and the interconnect substrate and/or between the computing package 200 and the interconnect substrate 302. The interconnect substrate 302 may be for example, a glass substrate, a ceramic substrate, a dielectric substrate, an organic substrate (e.g., an organic core), a semiconductor substrate (e.g., a semiconductor wafer), the like, or a combination thereof. In some embodiments, the interconnect substrate 302 includes conductive routing (e.g., conductive lines, vias, redistribution structures, or the like) that electrically connects the photonic package 100 and the computing package 200 and allows transmission of electrical signals between the photonic package 100 and the computing package 200 (represented by the dashed arrow in FIG. 13). The interconnect substrate 302 may include passive or active devices, in some embodiments. In this manner, the photonic system 300 may be a System-on-Wafer (SoW), a Chip-on-System-on-Wafer (CoWoS), or the like. In some embodiments, the interconnect substrate 302 may be another type of structure, such as an integrated fan-out structure, a redistribution structure, or the like.

In some embodiments, the photonic package 100 receives optical signals from an optical fiber 150 (e.g., at a grating coupler 106A) which are detected using suitable photonic components 106. One or more electronic dies 122 in the photonic package 100 may then generate corresponding electrical signals based on the optical signals. These electrical signals may then be transmitted to the computing package 200 through the interconnect substrate 302. In some embodiments, the computing package 200 generates electrical signals that may be transmitted to one or more electronic dies 122 of a photonic package 100 through the interconnect substrate 302. The electronic dies 122 may then generate optical signals using suitable photonic components 106 and couple these optical signals into an optical fiber 150 (e.g., using a grating coupler 106A). In some embodiments, the computing package 200 controls the electronic dies 122 of the photonic package 100. In this manner, the photonic package 100 may be considered an "optical input/output (I/O) module" for the photonic system 300. Use of photonic packages 100 as described herein may reduce the size or cost of a photonic system 300 while providing high-speed optical communication.

Figure 14:
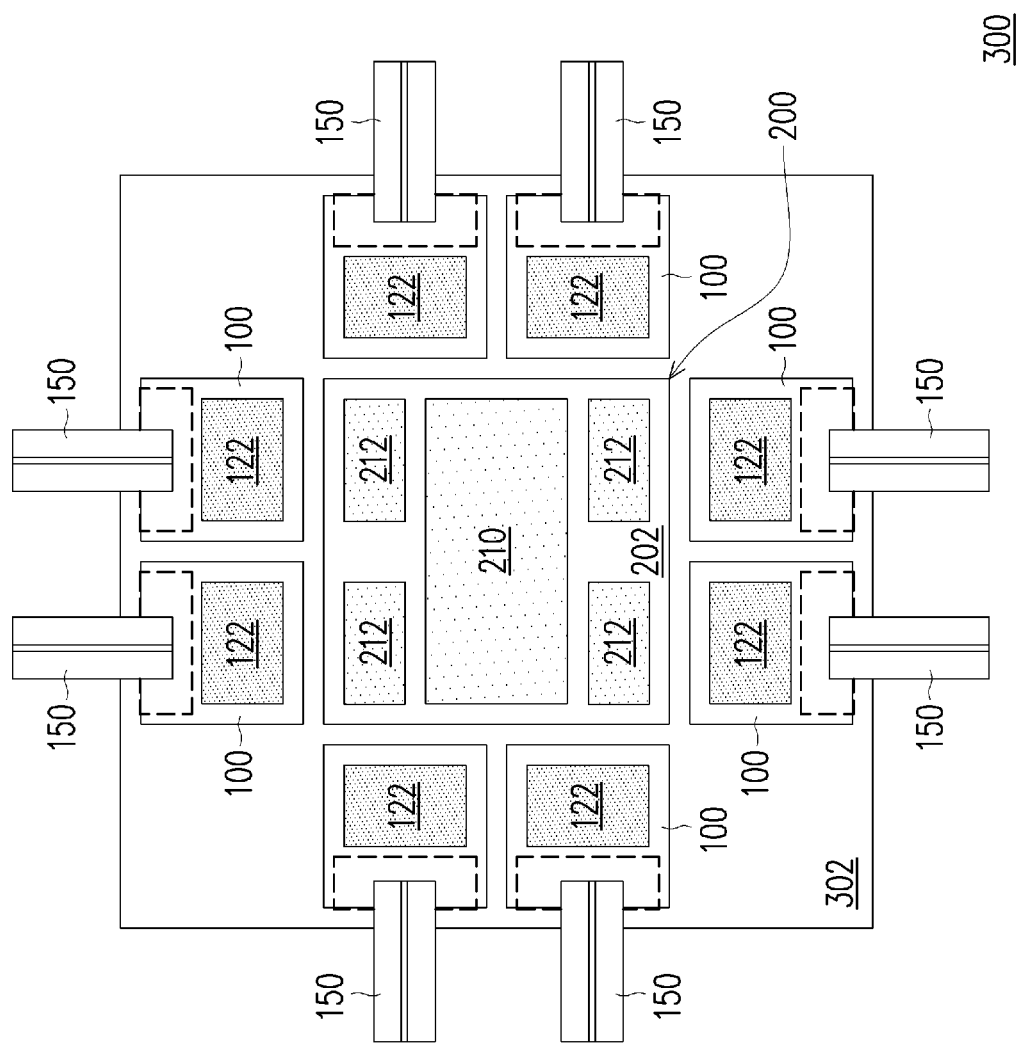

FIG. 14 shows a plan view of a photonic system 300, in accordance with some embodiments. The photonic system 300 is similar to that shown in FIG. 13, except multiple photonic packages 100 are attached to the interconnect substrate 302. Additionally, the example computing package 200 shown in FIG. 14 includes multiple memory dies 212, though the computing package 200 may be different than shown. The multiple photonic packages 100 of the photonic system 300 may be electrically connected to the computing package 200 through the interconnect substrate 302. In this manner, a photonic system 300 may include a computing package 200 configured to communicate using multiple optical fibers 150 and multiple photonic packages 100. A photonic system 300 may include more or fewer photonic packages 100 or computing packages 200, which may be of similar or different types or configurations. The photonic package(s) 100 and/or computing package(s) of a photonic system 300 may also have a different arrangement or configuration than shown in FIG. 14.

Figure 15:
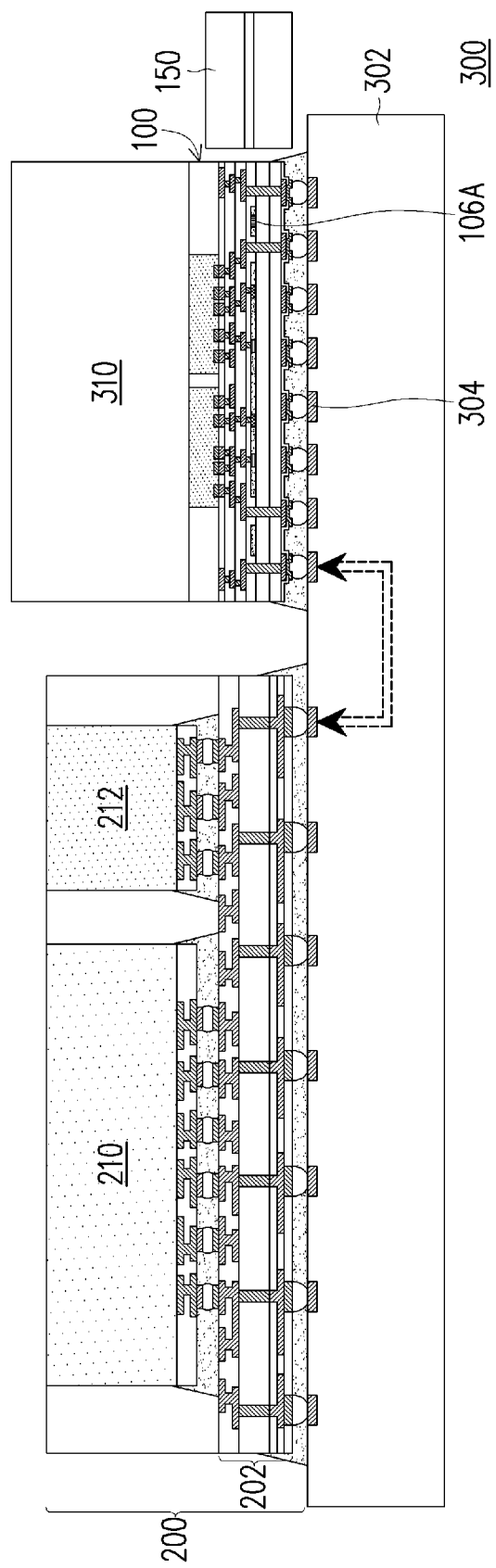

Turning to FIG. 15, a photonic system 300 having a support 310 attached to the photonic package 100 is shown, in accordance with some embodiments. The photonic package 100 shown in FIG. 15 is similar to the photonic packages 100 shown in FIGS. 13-14, except for the support 310 attached to the top surface of the photonic package 100. The support 310 is a rigid structure that is attached to the photonic package 100 in order to provide structural or mechanical stability for the photonic package 100. The use of a support 310 can reduce warping or bending of the photonic package 100, which can improve the performance of the optical structures such as the waveguides 104 or photonic components 106. The support 310 may comprise one or more materials such as silicon (e.g., a silicon wafer, bulk silicon, or the like), a silicon oxide, a metal, an organic core material, the like, or another type of material. The support 310 may be attached to the photonic package 100 using direct bonding, an adhesive layer, or using another suitable technique. The support 310 may be attached to the photonic package 100 before the photonic package 100 is attached to the interconnect substrate 302. In some embodiments, the support 310 may have a thickness between about between about 500 μm and about 700 μm. The support 310 may have a thickness that is greater than, about the same as, or smaller than that of the photonic package 100. The support 310 may also have lateral dimensions (e.g., length, width, and/or area) that are greater than, about the same as, or smaller than those of the photonic package 100. As shown in FIG. 15, an optical fiber 150 may be edge mounted to a photonic package 100 that is attached to a support 310.

Figure 16A:
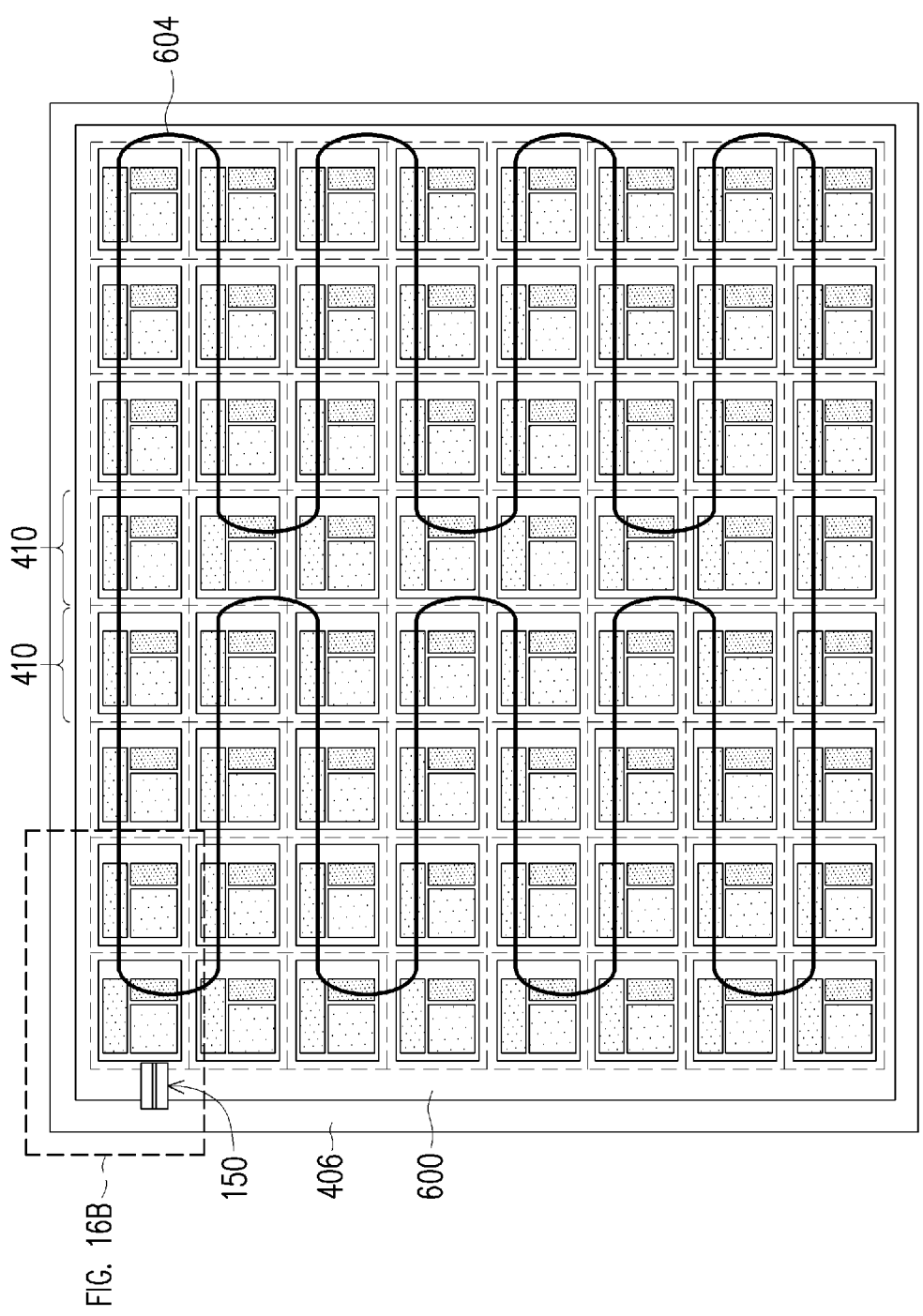
FIGS. 16A-B illustrate plan views of a photonic computing system, in accordance with some embodiments.
Figure 16B:
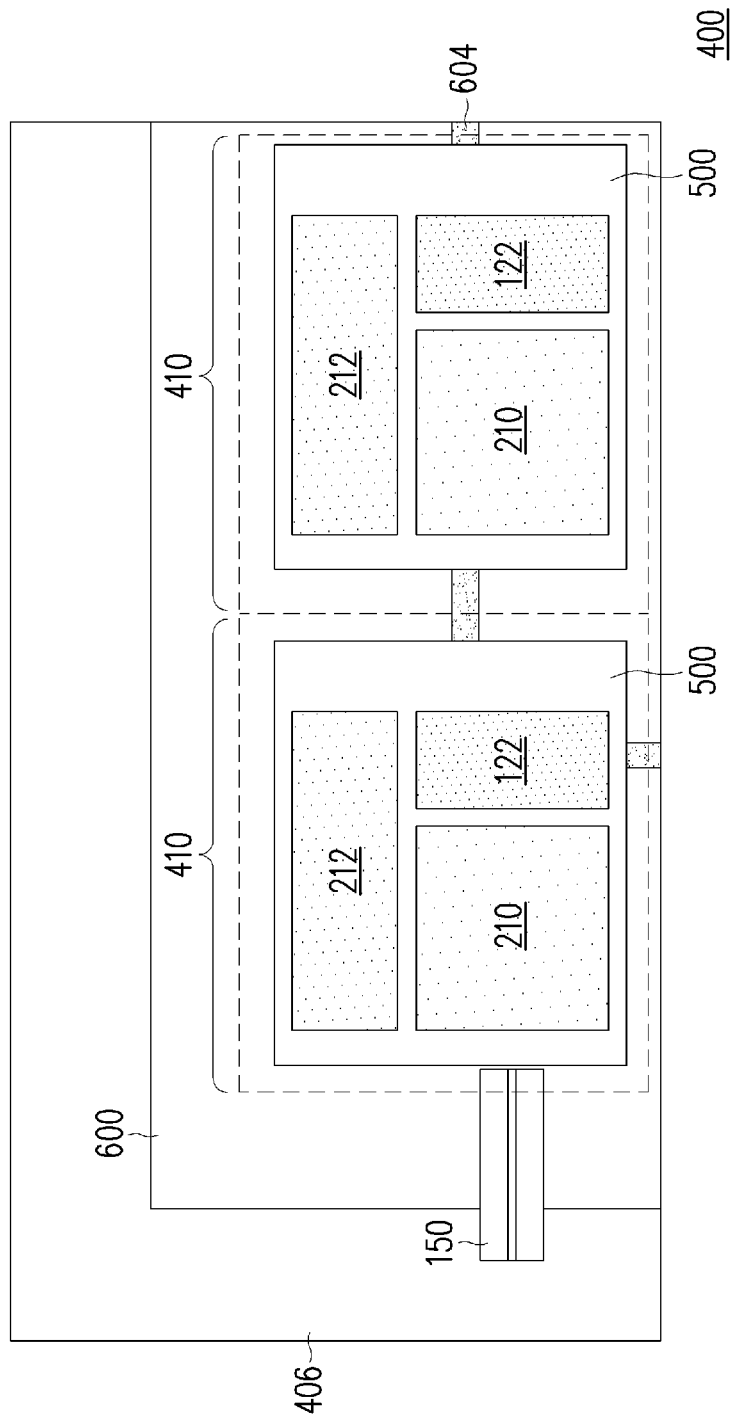

FIGS. 16A and 16B illustrate a schematic of a photonic computing system (PCS) 400, in accordance with some embodiments. The PCS 400 includes a plurality of sites 410, each of which is a separate computing system. The PCS 400 may be, for example, a high performance computing (HPC) system. In some embodiments, the PCS 400 includes multiple photonic packages 500 coupled to a photonic routing structure 600, in which each site 410 comprises a photonic package 500. FIG. 16A shows a plan view of a PCS 400 that includes multiple sites 410, and FIG. 16B is a detailed view of a region that includes two sites 410. Some features of the PCS 400 such as the photonic routing structure 600 are shown as semi-transparent in FIGS. 16A-B for clarity. A PCS 400 may include more or fewer sites 410 than shown, which may be arranged or configured differently than shown.

As shown schematically in FIGS. 16A-B, each site 410 communicates with other sites 410 using one or more optical networks 604 formed in the photonic routing structure 600. The optical network 604 formed in the photonic routing structure 600 may include, for example, silicon waveguides and grating couplers 606, which may be similar to the waveguides 104 and grating couplers 106A described in FIGS. 1-3. In some embodiments, the optical network 604 is a closed loop (or ring) that connects to each site 410 of the photonic routing structure 600, as shown in FIG. 16A. In some embodiments, the optical network 604 may not be a closed loop, may have branching sections, or may include separated sections. In an embodiment, the optical network 604 includes multiple waveguides connecting the sites 410 in a peer-to-peer manner. The optical network 604 may carry optical signals and/or optical power between sites 410. In some embodiments, the optical network 604 may also carry optical signals and/or optical power transmitted between the PCS 400 and external components. For example, the optical network 604 may be coupled to external components via one or more optical fibers 150. The photonic systems 500 may be connected to an interconnect substrate 406, which may provide electrical connections to the sites 410 and/or electrical routing between the sites 410.

Figure 17:
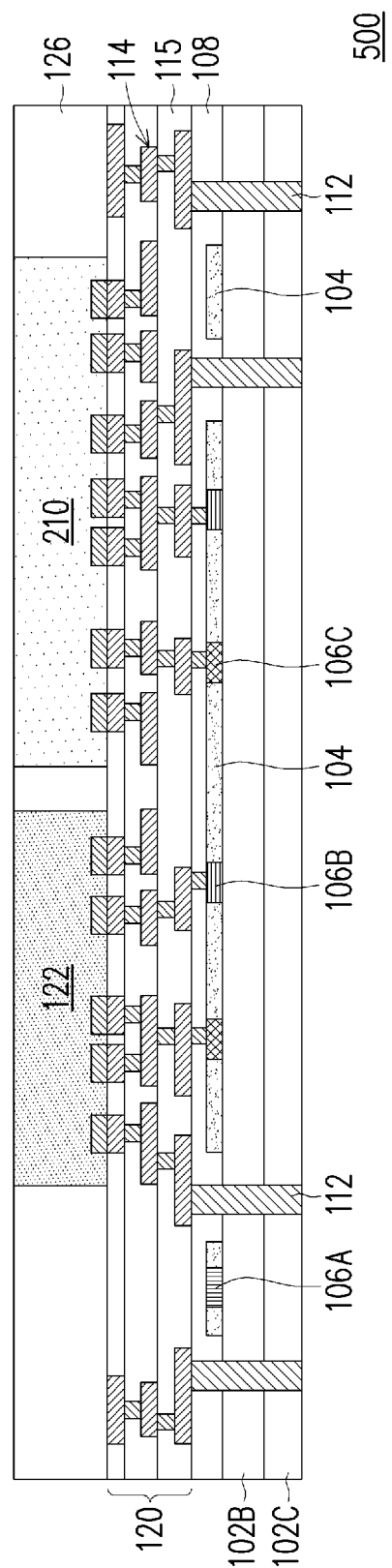
FIGS. 17 through 19 illustrate cross-sectional views of intermediate steps of forming a photonic package, in accordance with some embodiments.

FIGS. 17 through 24 show intermediate steps in the formation of a PCS 400, in accordance with some embodiments. Turning first to FIG. 17, a cross-sectional view of a photonic package 500 is shown, in accordance with some embodiments. The photonic package 500 may be similar to the photonic package 100 described above for FIGS. 11 and 12, except that the photonic package 500 includes a processing die 210 and a memory die 212 in addition to an electronic die 122. The memory die 212 is not shown in the cross-sectional view of FIG. 17, but is shown in the plan view of FIGS. 16A-B. FIG. 17 shows the photonic package 500 after the vias 112 have been exposed (e.g. using a CMP process or the like), similar to the photonic package 100 shown in FIG. 10.

The electronic die 122 of the photonic package 500 may be similar to the electronic die 122 of the photonic package 100 described above for FIG. 7. The processing die 210 and/or memory die 212 may be similar to the processing die 210 or memory die 212 of the computing package 200 described above for FIG. 13. The photonic package 500 may be formed in a similar process as the photonic package 100 as shown in FIGS. 1-11. For example, waveguides 104 and photonic components 106 may be formed as described for FIGS. 1-3, and the dies (e.g., 122, 210, 212) may be bonded to an interconnect structure 120 using a hybrid bonding process similar to that described for FIG. 7. In this manner, the electronic die 122 of each photonic package 500 may be electrically connected to the processing die 210 by the interconnect structure, and may facilitate transmission of signals between the processing die 210 and the waveguides 104. In some embodiments, a photonic package 500 may have lateral dimensions between about 10 mm and about 25 mm such as having dimensions of about 20 mm by 20 mm. The dies (e.g., 122, 210, 212) may have lateral dimensions between about 3 mm and about 20 mm such as having dimensions of about 5 mm by 10 mm, 10 mm by 10 mm, 8 mm by 16 mm, or other dimensions. In some embodiments, a photonic package 500 may include more dies (e.g., 122, 210, 212) than shown, and the functionality of multiple dies may be combined into a single die. The dies (e.g, 122, 210, 212) may also have different arrangements, sizes, or configurations than shown.

Figure 18:
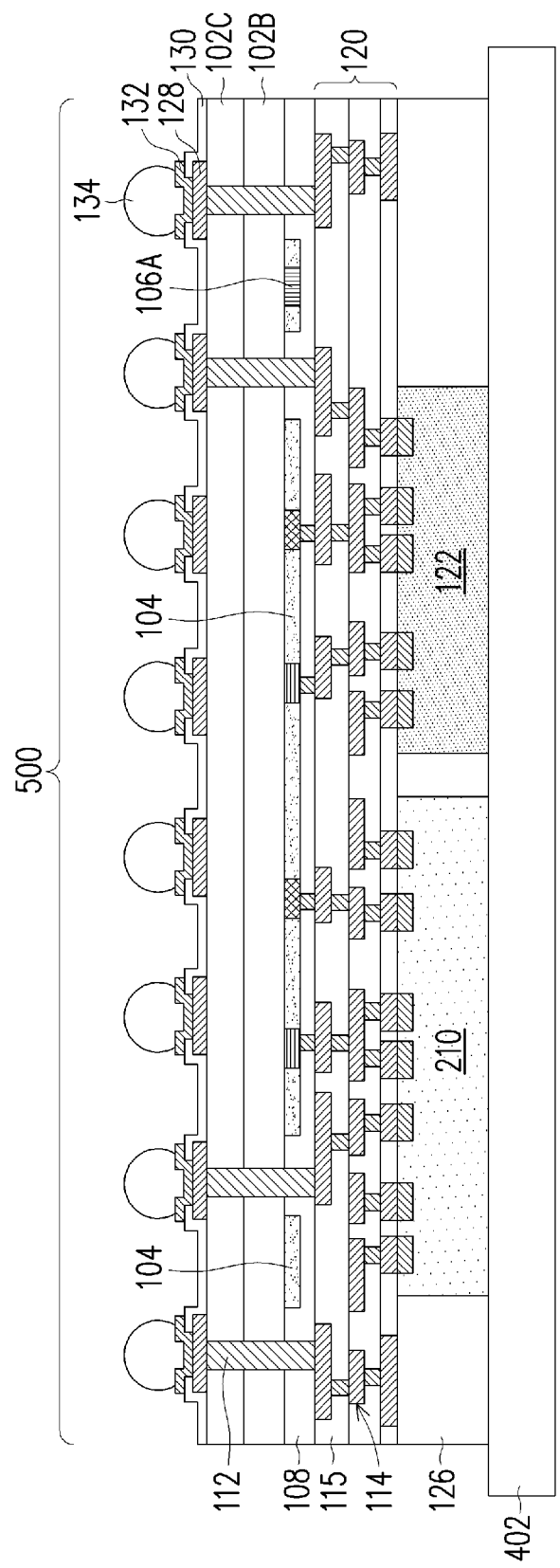

In FIG. 18, the photonic package 500 is flipped over and attached to a first carrier 402, and conductive connectors 134 are formed. The first carrier 402 may be, for example, a wafer (e.g., a silicon wafer), a panel, a glass substrate, a ceramic substrate, or the like. The photonic package 500 may be attached to the first carrier 402 using, for example, an adhesive or release layer (not shown). In some embodiments, the vias 112 may be exposed (e.g. using a CMP process or the like) after the photonic package 500 is attached to the first carrier 402.

After attaching the photonic package 500 to the first carrier 402, conductive pads 128 may be formed over the substrate 102 to make electrical connection to the vias 112. A passivation film 130 may be formed over the substrate 102C, and then UBMs 132 may be formed over the conductive pads 128. The conductive pads 128, passivation film 130, and UBMs 132 may be similar to those described for FIG. 11 and may be formed in a similar manner.

Figure 19:
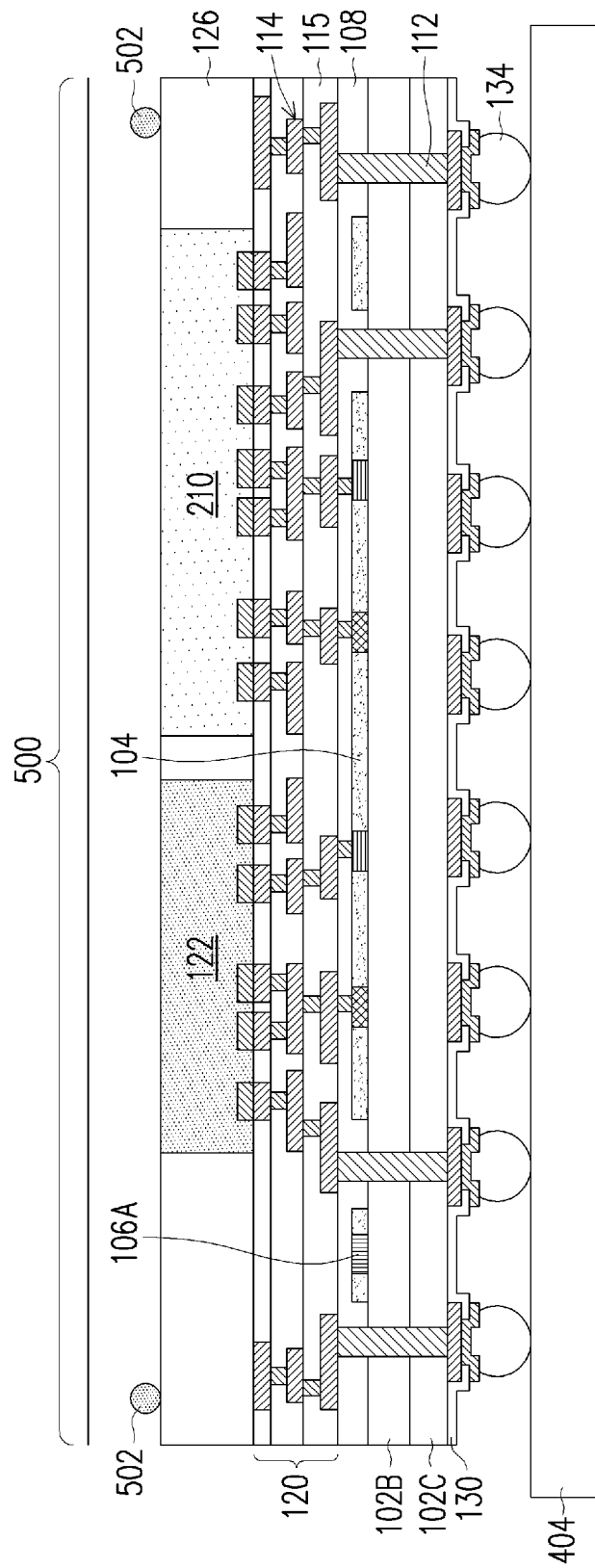

In FIG. 19, the photonic package 500 is flipped over and attached to a second carrier 404, and connectors 502 are formed on the photonic package 500, in accordance with some embodiments. The second carrier 404 may be a carrier similar to those described above for the first carrier 402, and the photonic package 500 may be attached to the second carrier 404 using an adhesive layer (not shown) or the like. The connectors 502 may be, for example, ball grid array (BGA) connectors, solder balls, metal pillars, controlled collapse chip connection (C4) bumps, micro bumps, electroless nickel-electroless palladium-immersion gold technique (ENEPIG) formed bumps, or the like. The connectors 502 may include a conductive material such as solder, copper, aluminum, gold, nickel, silver, palladium, tin, the like, or a combination thereof. In some embodiments, the connectors 502 are formed by initially forming a layer of solder through evaporation, electroplating, printing, solder transfer, ball placement, or the like. Once a layer of solder has been formed on the structure, a reflow may be performed in order to shape the material into the desired bump shapes.

In another embodiment, the connectors 502 comprise metal pillars (such as copper pillars or copper pads, not shown) formed by a sputtering, printing, electro plating, electroless plating, CVD, or the like. The metal pillars may be solder-free and may have substantially vertical sidewalls. In some embodiments, a metal cap layer is formed on the top of the metal pillars. The metal cap layer may include nickel, tin, tin-lead, gold, silver, palladium, indium, nickel-palladium-gold, nickel-gold, the like, or a combination thereof and may be formed by a plating process. In some embodiments, solder is formed or placed on the top of the metal pillars.

Figure 24:
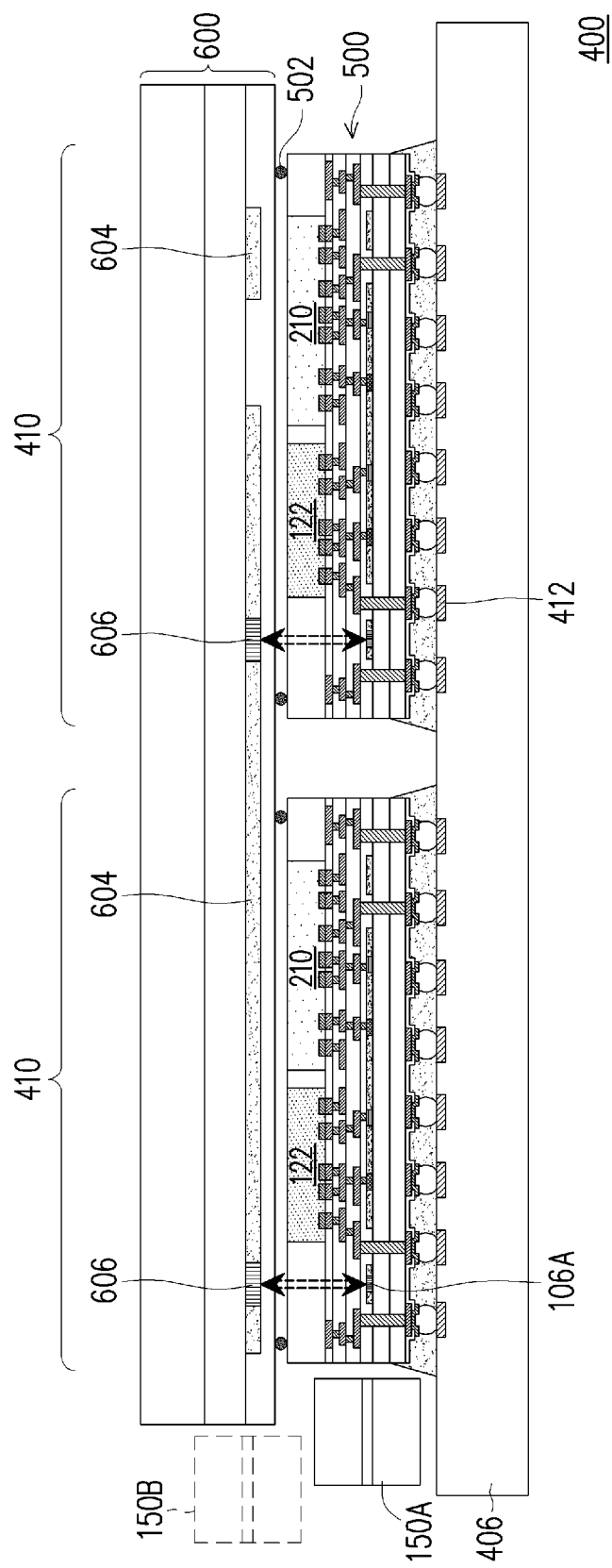

The connectors 502 form attachments between photonic package 500 and the photonic routing structure 600 (see FIG. 24). In some embodiments, the connectors 502 may have a thickness between about between about 20 μm and about 100 μm. In some embodiments, a smaller thickness of the connectors 502 may allow for improved optical coupling between the grating coupler(s) 106A of the photonic package 500 and the grating coupler(s) 606 of the photonic routing structure 600 (see FIG. 24). One or more connectors 502 may be formed on a photonic package 500, and the connectors 502 may be formed over the dielectric material 126 and/or over the dies (e.g., 122, 210, 212). In some embodiments, some of the photonic packages 500 of a PCS 400 may be free of the connectors 502, or different numbers of connectors 502 may be formed on different photonic packages 500.

Figure 22:
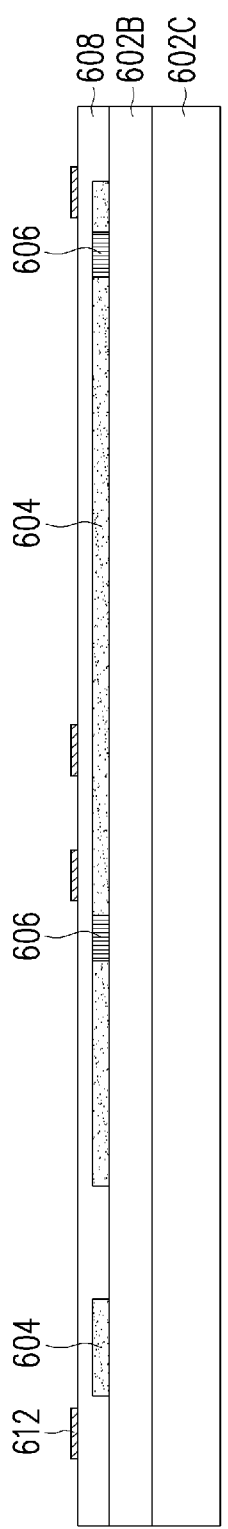

FIGS. 20 through 22 show intermediate steps in the formation of a photonic routing structure 600, in accordance with some embodiments. The photonic routing structure 600 includes an optical network 604. The optical network 604 includes silicon waveguides and grating couplers 606, which may be formed in a similar manner as the waveguides 104 and grating couplers io6A of the photonic package 100 described for FIGS. 1-3. Turning first to FIG. 20, a Buried Oxide (BOX) substrate 602 is shown. The BOX substrate 602 may be similar to the BOX substrate 102 shown in FIG. 1. For example, the BOX substrate 602 may include a silicon layer 602A, an oxide layer 602B, and a substrate 602C. In FIG. 20, the silicon layer 602A is patterned to form silicon regions for the optical network 604, including waveguides and grating couplers 606. The silicon layer 602A may be patterned using suitable photolithography and etching techniques. In some embodiments, one or more of the waveguides of the optical network 604 form a continuous loop. For example, in the cross-sectional view illustrated in FIG. 21, the portions of the optical network 604 shown may be part of a continuous loop comprising a single waveguide. Other configurations or arrangements are possible. The grating couplers 606 of the optical network may be formed using acceptable photolithography and etching techniques. In an embodiment, the grating couplers 606 are formed after the waveguides of the optical network 604 are defined.

In FIG. 22, a dielectric layer 608 is formed on the front side of the substrate 602, forming a photonic routing structure 600, in accordance with some embodiments. The dielectric layer 608 is formed over the optical network 604 and the oxide layer 602B. The dielectric layer 608 may be similar to the dielectric layer 108 described above and may be formed in a similar manner. For example, the dielectric layer 108 may be formed of silicon oxide, and may be formed by CVD, PVD, ALD, or another suitable process. In some embodiments, the dielectric layer 608 is then planarized using e.g., a CMP process, a grinding process, or the like. The dielectric layer 608 may be formed having a thickness over the oxide layer 602B between about 50 nm and about 500 nm, or a thickness over the optical network 604 between about 10 nm and about 200 nm, in some embodiments. In some cases, a thinner dielectric layer 608 may allow for more efficient optical coupling between a grating coupler 606 of a photonic routing structure 600 and a grating coupler 106A of a photonic package 500 (see FIG. 24) within a PCS 400. In some embodiments, pads 612 may be formed on the dielectric layer 608 for attachment to the connectors 502 of photonic packages 500. The pads 612 may be a metal such as copper, aluminum, or the like, and may be formed by plating, CVD, or another suitable process. In some embodiments, the photonic routing structure 600 may have lateral dimensions between about 50 mm and about 200 mm, such as having dimensions of about 200 mm by 200 mm.

Figure 23:
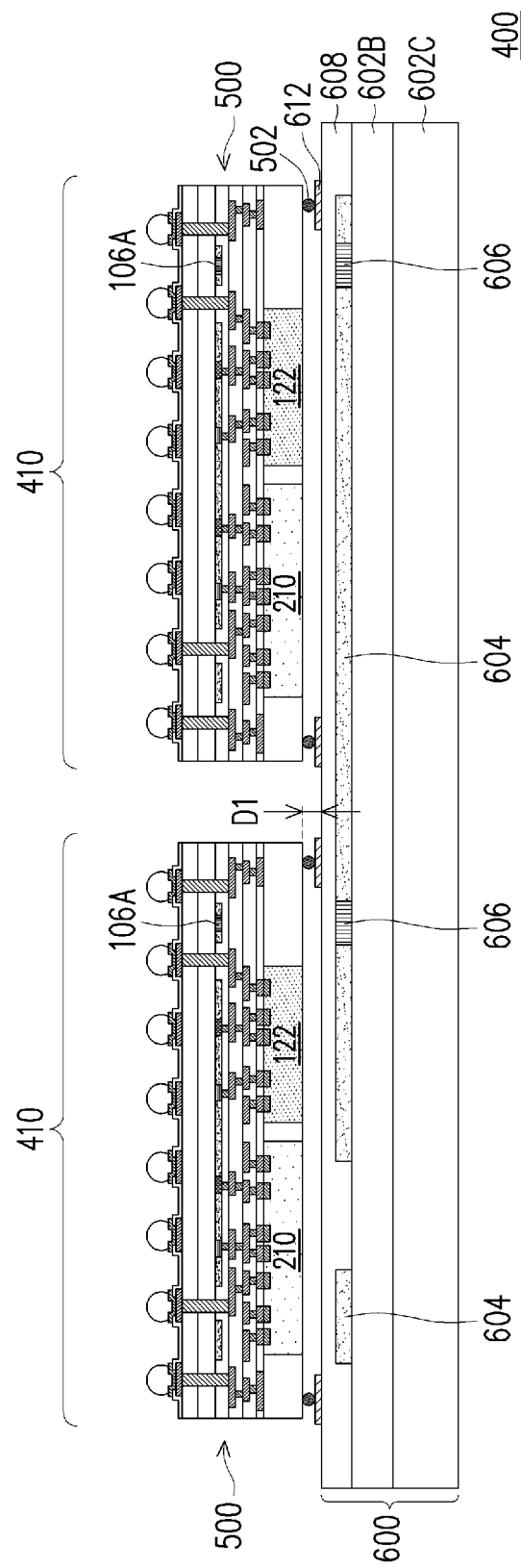
FIGS. 23 and 24 illustrate cross-sectional views of intermediate steps of forming a photonic routing structure, in accordance with some embodiments.

Turning to FIG. 23, the photonic packages 500 are attached to the photonic routing structure 600, in accordance with some embodiments. The photonic packages 500 may be placed on the photonic routing structure 600, for example, using e.g., a pick-and-place process. In some embodiments, the connectors 502 of a photonic package 500 may be aligned with corresponding pads 612 of the photonic routing structure 600 and then placed in physical contact with the pads 612. In some embodiments, once the connectors 502 are in physical contact with the pads 612, a reflow process may be performed to bond the material of the connectors 502 to the pads 612 and thus attach the photonic package 500 to the photonic routing structure 600.

Each photonic package 500 may be attached to the photonic routing structure 600 such that a grating coupler 106A of a photonic package 500 is aligned with a corresponding grating coupler 606 of the photonic routing structure 600. By aligning the grating couplers 106A and the grating couplers 606, optical signals may be transmitted between the photonic packages 500 and the photonic routing structure 600, described in greater detail below. A grating coupler 106A may be aligned directly above the corresponding grating coupler 606 or may be laterally offset from the corresponding grating coupler 606. In some embodiments, aligning the connectors 502 of a photonic package 500 to corresponding pads 612 also aligns the grating couplers 106A to the corresponding grating couplers 606. In some cases, the alignment of the grating couplers 106A and the grating couplers 606 has a lateral tolerance of about +/−2 μm. In some embodiments, after attachment, the photonic packages 500 may be be vertically separated from the photonic routing structure 600 by a distance D1 that between about 50 μm and about 150 μm. In some cases, a smaller separation distance D1 may allow for more efficient optical coupling between the grating couplers 606 of the photonic routing structure 600 and the grating couplers 106A of the photonic packages 500.

Turning to FIG. 24, the photonic packages 500 are connected to the interconnect substrate 406, forming the PCS 400. The photonic packages 500 may be electrically connected to the interconnect substrate 406 by the conductive connectors 134 of the photonic packages 500. In some embodiments, an underfill may be formed between the photonic packages 500 and the interconnect substrate 406. The interconnect substrate 406 may be for example, a glass substrate, a ceramic substrate, a dielectric substrate, an organic substrate (e.g., an organic core), a semiconductor substrate (e.g., a semiconductor wafer), the like, or a combination thereof. In some embodiments, he interconnect substrate 406 includes conductive routing (e.g., conductive lines, vias, redistribution structures, or the like) that electrically connect the photonic packages 500. The interconnect substrate 406 may include passive or active devices, in some embodiments. In this manner, the PCS 400 may be a System-on-Wafer (SoW), a Chip-on-System-on-Wafer (CoWoS), or the like. In some embodiments, the interconnect substrate 406 may be another type of structure, such as an integrated fan-out structure, a redistribution structure, or the like.

As shown in FIG. 24, an optical fiber 150 (shown in FIG. 24 as optical fiber 150A) may be edge mounted to a photonic package 500, in some embodiments. An optical fiber 150 (shown in FIG. 24 as optical fiber 150B) may be edge mounted to the photonic routing structure 600, in some embodiments. In this manner, an optical fiber 150 may be optically coupled to the PCS 400 (through a photonic package 500 or through the photonic routing structure 600) to provide optical power to the PCS 400 and/or to facilitate optical communication with the PCS 400. In some embodiments, more than one optical fiber 150 may be coupled to the PCS 400, which may include optical fibers 150 edge mounted to one or more photonic packages 500 and/or edge mounted to the photonic routing structure 600.

The PCS 400 uses the photonic routing structure 600 to facilitate communication between two or more sites 410, which may be adjacent or separated within the PCS 400. In some embodiments, the PCS 400 receives optical power from an optical fiber 150 that is edge mounted to a first photonic package 500 of a first site 410. The optical power may be, for example, output from an external laser diode or other optical power source (not shown). The optical power may be coupled into the waveguides 104 of the first photonic package 500 by an edge coupler 106D (not shown in FIG. 24). A processing die 210 of the first photonic package 500 may send electrical signals to the electronic die 122 of the first photonic package 500, and the electronic die 122 may send corresponding electrical signals to a modulator 106C of the first photonic package 500 to modulate the optical power within the waveguides 104 of the first photonic package 500. By modulating the optical power in this manner, the electrical signals of the processing die 210 are converted into optical signals within the waveguides 104 of the first photonic package 500.

The optical signals generated within the waveguides 104 of the first photonic package 500 may then be coupled into the optical network 604 of the photonic routing structure 600 and transmitted to a second photonic package 500 of a second site 410. For example, a grating coupler 106A may direct the optical signals through the dielectric layers (e.g., 108, 115, 126) of the first photonic package 500, through the dielectric layer 608 of the photonic routing structure 600, and into a grating coupler 606 of the photonic routing structure 600. The grating coupler 606 couples the optical signals into the optical network 604, through which the optical signals are transmitted to the second site 410.

The optical signals may then be coupled into the second photonic package 500 of the second site 410. For example, the a grating coupler 606 may direct the optical signals through the dielectric layer 608 of the photonic routing structure 600, through the dielectric layers (e.g., 108, 115, 126) of the second photonic package 500, and into a grating coupler 106A of the second photonic package 500. The grating coupler 106A couples the optical signals into the waveguides 104 of the second photonic package 500. The optical signals within the waveguides 104 may be detected using a photodetector 106B that converts the optical signals into electrical signals, which are received by the electronic die 122 of the second photonic package 500. The electronic die 122 of the second photonic package 500 may transmit the electrical signals to a processing die 210 of the second photonic package 500, which may process the electronic signals. The second site 410 may generate electrical signals which may be optically transmitted to another site 410 by modulating the optical power within the waveguides 104 of the second photonic package 500 to generate optical signals and then coupling those optical signals into the optical network 604 of the photonic routing structure 600. In this manner, two or more sites 410 of a PCS 400 may communicate optically using the photonic routing structure 600, allowing for fast and efficient high-speed computation.

Figure 25A:
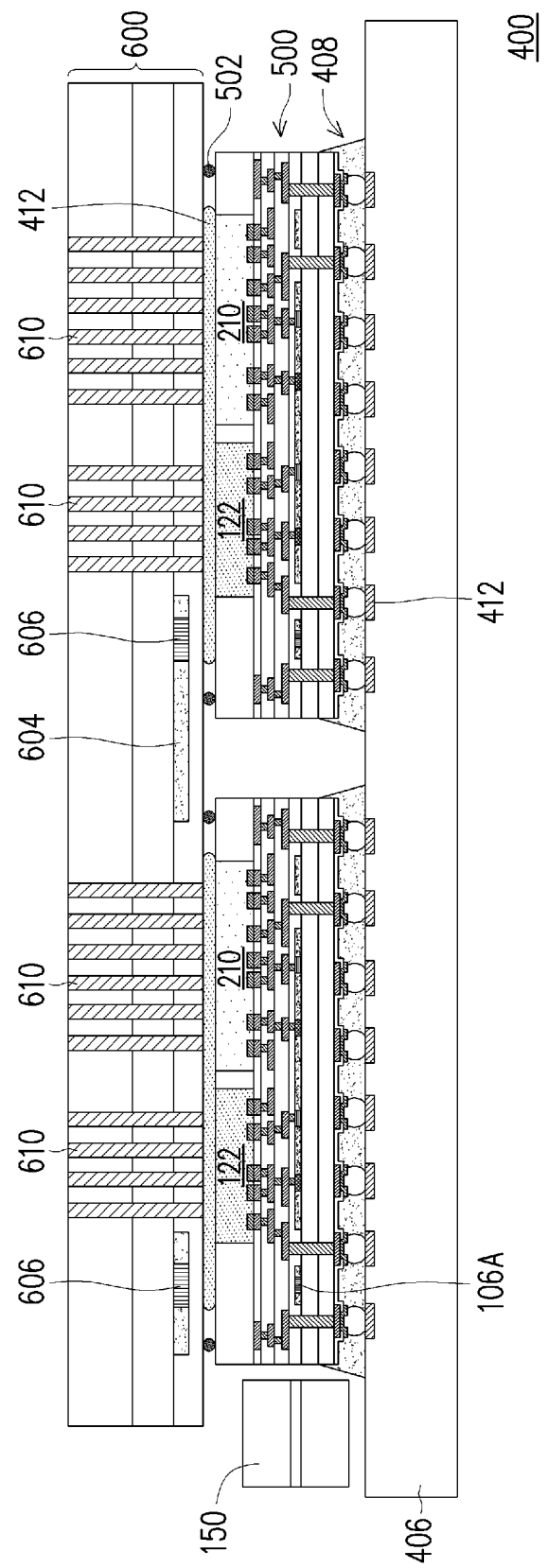
FIGS. 25A-B illustrate cross-sectional views of photonic computing systems, in accordance with some embodiments.
Figure 25B:
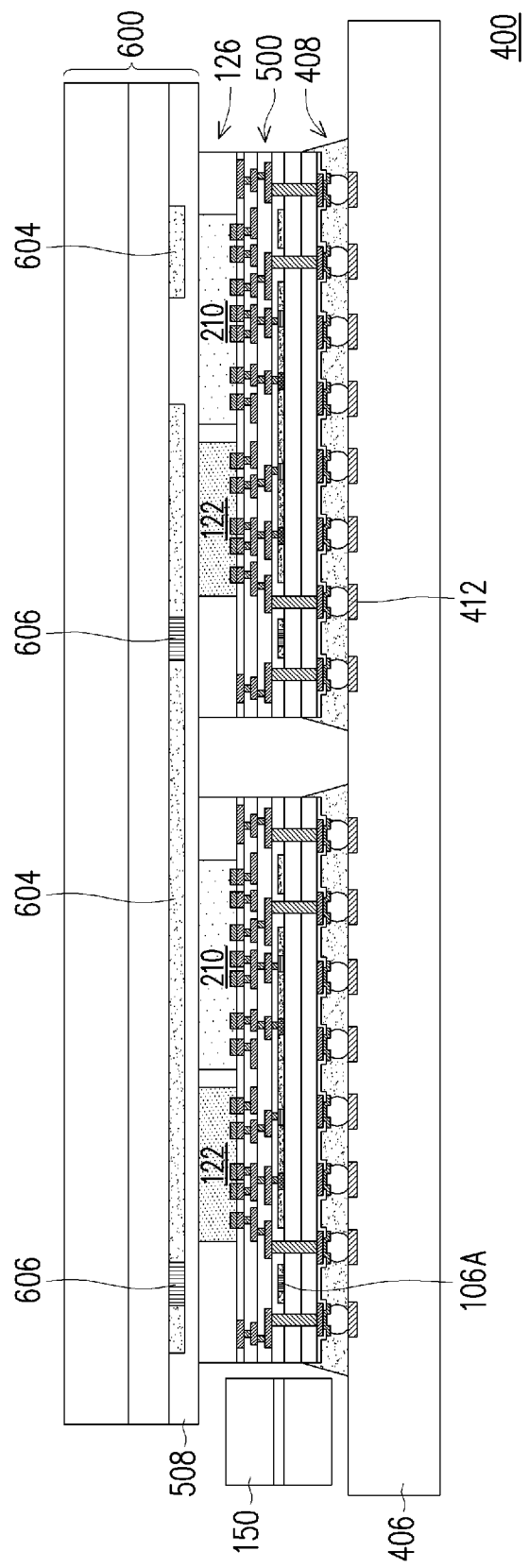

FIGS. 25A and 25B each illustrate a PCS 400, accordance with some embodiments. The PCS 400 shown in FIG. 25A is similar to the PCS 400 described for FIG. 24, except that the photonic routing structure 600 shown in FIG. 25A includes thermal vias 610 that extend through the photonic routing structure 600. Additionally, a thermal adhesive 412 is formed between each photonic package 500 and the photonic routing structure 600. The thermal vias 610 may be formed by, for example, etching openings extending through the photonic routing structure 600 and depositing a suitable metal material (e.g., copper or another metal) within the openings using a suitable deposition process (e.g., plating or another process). In some embodiments, a liner material may be deposited in the openings prior to deposition of the metal material. Excess metal material may be removed using a CMP process or the like, in some embodiments. The thermal adhesive 412 may be a material such as a thermal interface material (TIM), a material comprising carbon nanotubes, or the like. The thermal vias 610 and the thermal adhesive 412 allow for more efficient transfer of heat away from the photonic packages 500, and thus may improve operation of the PCS 400. The thermal vias 610 and/or the thermal adhesive 412 may be combined with other embodiments of a PCS 400 as described herein.

The PCS 400 shown in FIG. 25B is similar to the PCS 400 shown in FIG. 24, except that the photonic routing structure 600 is bonded to the photonic packages 500 using a direct bonding process or the like. For example, a surface oxide layer of the photonic routing structure 600 may be direct bonded to a surface oxide layer of each photonic structure 500. The photonic routing structure 600 may be bonded using a process similar to that described previously for FIG. 7, in some embodiments. By using a direct bonding process to attach the photonic routing structure 600 to the photonic packages 500, the transmission of optical signals between the photonic routing structure 600 and the photonic packages 500 may be improved. For example, using direct bonding reduces the distance between the grating couplers 106A of the photonic packages 500 and the grating couplers 606 of the photonic routing structure 600, which can improve the optical coupling. Additionally, using direct bonding as described eliminates the presence of a gap between the photonic routing structure 600 and the photonic packages 500, which can reduce scattering or reflection of optical signals transmitted between the photonic routing structure 600 and the photonic packages 500, which can further improve optical coupling and transmission efficiency, and reduce the amount of optical power used in the PCS 400.

Embodiments may achieve advantages. The embodiments described herein allow for an optical coupling to a computing site to be formed with less cost and improved operation. For example, by hybrid bonding electronic dies to a waveguide structure, an optical fiber may be mounted vertically. This allows for improved optical coupling to an optical fiber. The electronic dies are used as an "optical I/O interface" between optical communications components and processing dies. For example, the electronic dies can serve as the optical I/O interface for a CoWoS HPC system formed on the same substrate in a MCM package. In some cases, high speed SerDes devices and may be integrated with photonics device while having flexible and efficient optical fiber attachment, which includes in both vertical or edge optical fiber connections. By having edge surfaces or top surfaces of a photonic device exposed to the atmosphere, signal loss due to optical coupling can be reduced. In some cases, the embodiments described herein may reduce processing costs and reduce the size of a photonic system. In some cases, the use of a single photonic routing structure to optically connect computing sites can allow increased device performance in, e.g., HPC applications that include many interconnected computer systems. Transmitting optical signals between computing sites may have less signal attenuation at high frequencies, lower crosstalk, and less switching noise than transmitting electrical signals with e.g., conductive lines and the like. Optical communication may allow for lower-latency and higher-bandwidth communication between some of the sites.

In some embodiments, a device includes a first package connected to an interconnect substrate, wherein the interconnect substrate includes conductive routing; and a second package connected to the interconnect substrate, wherein the second package includes a photonic layer on a substrate, the photonic layer including a silicon waveguide coupled to a grating coupler and to a photodetector; a via extending through the substrate; an interconnect structure over the photonic layer, wherein the interconnect structure is connected to the photodetector and to the via; and an electronic die bonded to the interconnect structure, wherein the electronic die is connected to the interconnect structure. In an embodiment, the device includes an optical fiber mounted over the second package, wherein the optical fiber is optically coupled to the grating coupler of the second package. In an embodiment, the photonic layer includes an edge coupler configured to optically couple to an optical fiber mounted adjacent the second package. In an embodiment, the photonic layer includes an optical modulator coupled to the silicon waveguide, wherein the interconnect structure is connected to the optical modulator. In an embodiment, the device includes a third package connected to the interconnect substrate, the third package including a photonic layer including a silicon waveguide coupled to a grating coupler and to a photodetector. In an embodiment, the electronic die is hybrid bonded to the interconnect structure. In an embodiment, the first package includes a processing die and a memory die.

In some embodiments, a photonic system includes an interconnect substrate comprising electrical routing; packages electrically connected to the interconnect substrate, wherein each package includes a first silicon waveguide including a first grating coupler; an interconnect structure over the silicon waveguide; and a semiconductor device bonded to the interconnect structure, wherein the semiconductor device is electrically connected to the interconnect structure; and a photonic routing structure attached to the packages, wherein the photonic routing structure includes a second silicon waveguide comprising second grating couplers, wherein each second grating coupler is optically coupled to a first grating coupler of a package. In an embodiment, the semiconductor device includes a processing die. In an embodiment, the second silicon waveguide is optically coupled to each package. In an embodiment, the semiconductor device is hybrid bonded to the interconnect structure. In an embodiment, the photonic system includes an optical fiber that is optically coupled to the first silicon waveguide of a first package of the packages. In an embodiment, the photonic routing structure is attached to the packages by solder bumps. In an embodiment, the photonic routing structure is attached to the packages by hybrid bonding. In an embodiment, the photonic routing structure includes thermal vias extending from a first side of the photonic routing structure to a second side of the photonic routing structure. In an embodiment, each package includes an electronic die bonded to the interconnect structure; and a photodetector coupled to the first silicon waveguide, wherein the electronic die is electrically connected to the photodetector by the interconnect structure.

In some embodiments, a method includes patterning a silicon layer to form a waveguide; forming photonic components in the waveguide; forming an interconnect structure over the waveguide and the photonic components, the interconnect structure including conductive features and insulating layers; bonding semiconductor devices to the interconnect structure using a hybrid bonding process; and forming a dielectric layer on the interconnect structure and surrounding the semiconductor devices. In an embodiment, the photonic components include at least one grating coupler. In an embodiment, the method includes attaching a photonic routing structure to the dielectric layer, wherein the photonic routing structure is optically coupled to at least one photonic component. In an embodiment, the method includes attaching an optical fiber to the dielectric layer, wherein the optical fiber is optically coupled to at least one photonic component.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
   a first package and a second package connected to an interconnect substrate, wherein the interconnect substrate comprises conductive routing, wherein the first package and the second package each respectively comprise:
      a photonic layer on a substrate, the photonic layer comprising a silicon waveguide coupled to a grating coupler and to a photodetector;
      a via extending through the substrate;
      an interconnect structure over the photonic layer, wherein the interconnect structure is connected to the photodetector and to the via; and
      an electronic die bonded to the interconnect structure, wherein the electronic die is connected to the interconnect structure; and
   an optical routing structure attached to the first package and the second package, wherein the optical routing structure comprises a second photonic layer, the second photonic layer comprising a second silicon waveguide, wherein the second silicon waveguide is optically coupled to the photonic layer of the first package and the photonic layer of the second package, wherein the optical routing structure is attached to the first package and the second package by solder bumps.

2. The device of claim 1, further comprising an optical fiber mounted adjacent the optical routing structure, wherein the optical fiber is optically coupled to the second photonic layer of the optical routing structure.

3. The device of claim 1, wherein the photonic layer of the second package comprises an edge coupler configured to optically couple to an optical fiber mounted adjacent the second package.

4. The device of claim 1, wherein the photonic layer of the first package comprises an optical modulator coupled to the silicon waveguide, wherein the interconnect structure is connected to the optical modulator.

5. The device of claim 1 wherein the electronic die of the first package is hybrid bonded to the interconnect structure.

6. The device of claim 1, wherein the first package comprises a processing die and a memory die.

7. A photonic system, comprising:
   an interconnect substrate comprising electrical routing;
   a plurality of packages electrically connected to the interconnect substrate, wherein each package comprises:
      a first silicon waveguide comprising a first grating coupler;
      an interconnect structure over the first silicon waveguide; and
      a semiconductor device bonded to the interconnect structure, wherein the semiconductor device is electrically connected to the interconnect structure; and
   a photonic routing structure attached to the plurality of packages, wherein the photonic routing structure comprises a second silicon waveguide comprising a plurality of second grating couplers, wherein each second grating coupler is optically coupled to a first grating coupler of a package, wherein the plurality of packages are between the interconnect substrate and the photonic routing structure, wherein a first plane intersects a first package of the plurality of packages, the interconnect substrate, and the photonic routing structure, the first plane being orthogonal to a top surface of the interconnect substrate.

8. The photonic system of claim 7, wherein the semiconductor device comprises a processing die.

9. The photonic system of claim 7, wherein the second silicon waveguide is optically coupled to each package of the plurality of packages.

10. The photonic system of claim 7, wherein the semiconductor device is hybrid bonded to the interconnect structure.

11. The photonic system of claim 7, further comprising an optical fiber that is optically coupled to the first silicon waveguide of a first package of the plurality of packages.

12. The photonic system of claim 7, wherein the photonic routing structure is attached to the plurality of packages by solder bumps.

13. The photonic system of claim 7, wherein the photonic routing structure is attached to the plurality of packages by hybrid bonding.

14. The photonic system of claim 7, wherein the photonic routing structure further comprises thermal vias extending from a first side of the photonic routing structure to a second side of the photonic routing structure.

15. The photonic system of claim 7, wherein each package further comprises:
   an electronic die bonded to the interconnect structure; and
   a photodetector coupled to the first silicon waveguide, wherein the electronic die is electrically connected to the photodetector by the interconnect structure.

16. A photonic system, comprising:
   a photonic routing structure comprising an optical waveguide; and
   a plurality of semiconductor packages attached to the photonic routing structure, wherein each semiconductor package comprises:
      a silicon waveguide on a dielectric layer, wherein the silicon waveguide is optically coupled to the optical waveguide of the photonic routing structure;
      a photonic device on the dielectric layer, wherein the photonic device is optically coupled to the silicon waveguide;
      an interconnect structure over the photonic device, wherein the interconnect structure is electrically coupled to the photonic device; and
      a semiconductor device over the interconnect structure, wherein the semiconductor device is electrically coupled to the interconnect structure.

17. The photonic system of claim 16 further comprising an optical fiber attached to one semiconductor package, wherein the optical fiber is optically coupled to the silicon waveguide of the one semiconductor package.

18. The photonic system of claim 16, wherein the photonic routing structure is directly bonded to the plurality of semiconductor packages.

19. The photonic system of claim 16, wherein the photonic routing structure comprises a plurality of grating couplers, wherein the plurality of grating couplers optically couple the optical waveguide to the silicon waveguides of the plurality of semiconductor packages.

20. The photonic system of claim 16 further comprising a thermal adhesive between the photonic routing structure and each semiconductor package of the plurality of semiconductor packages.

* * * * *